May 31, 1966    J. M. HUNT    3,254,337
DATA CONVERSION SYSTEM
Filed Feb. 21, 1963    10 Sheets-Sheet 4

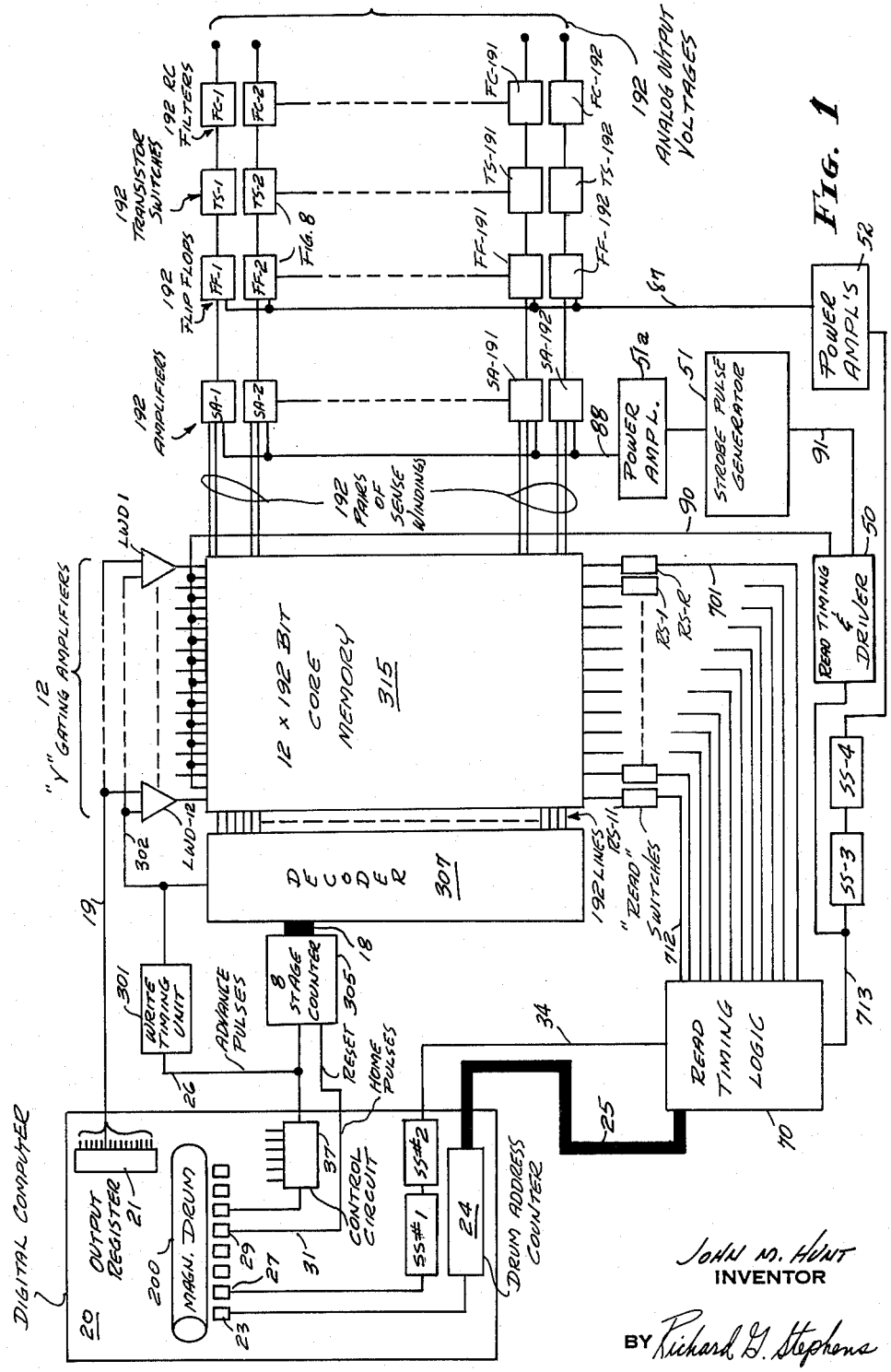

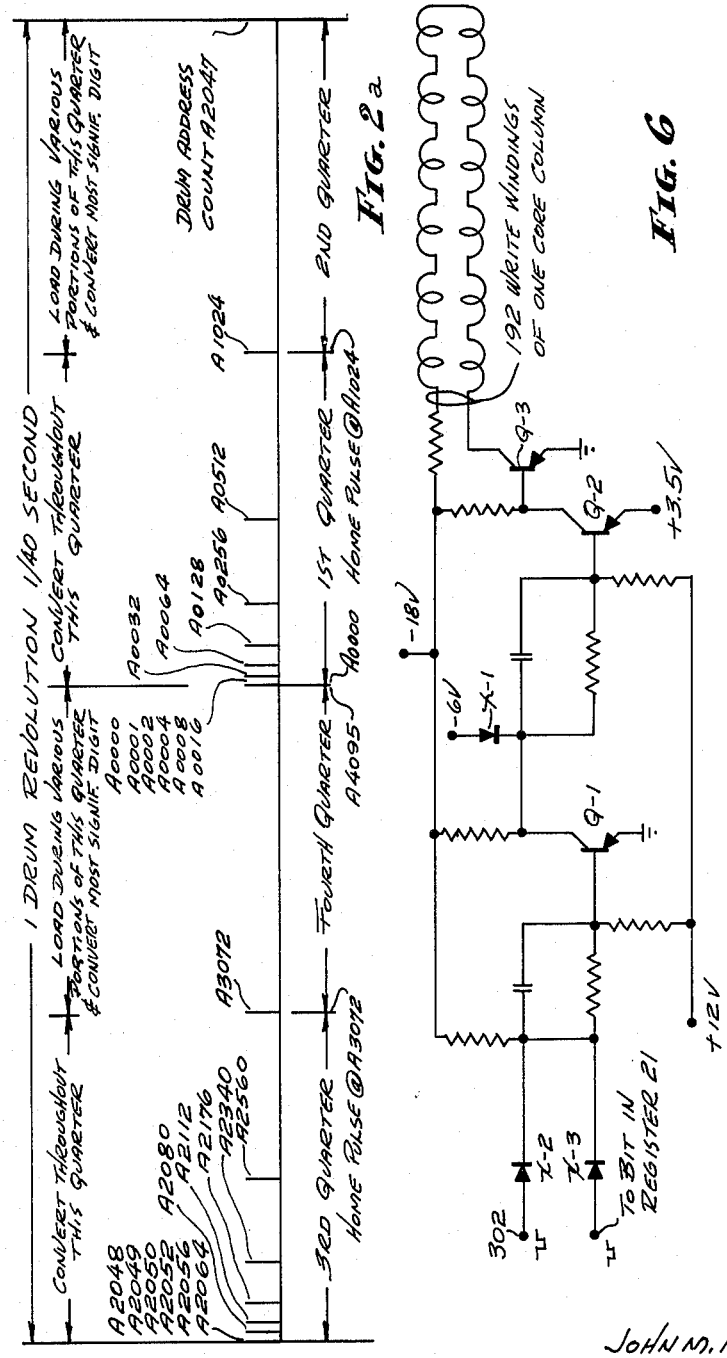

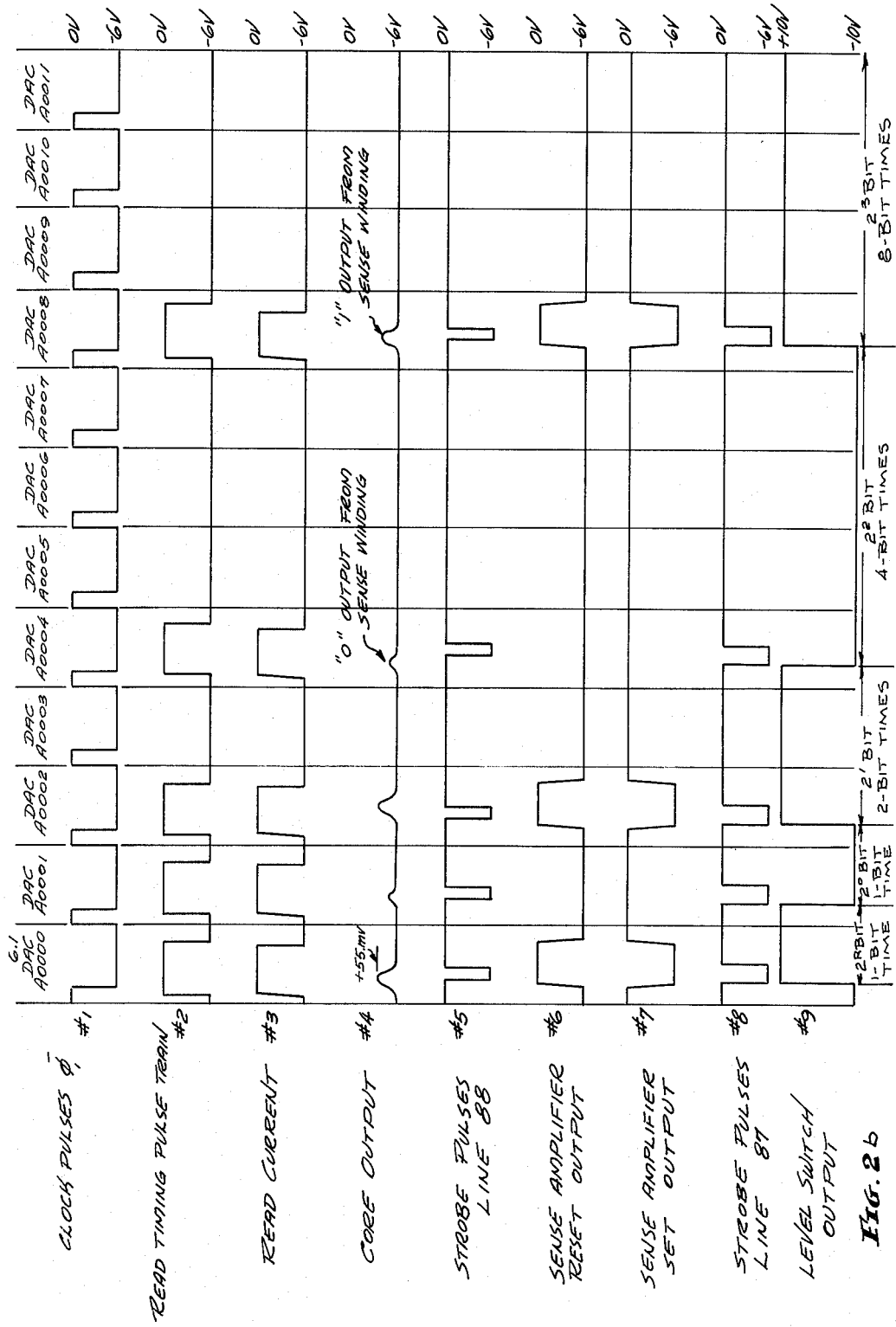

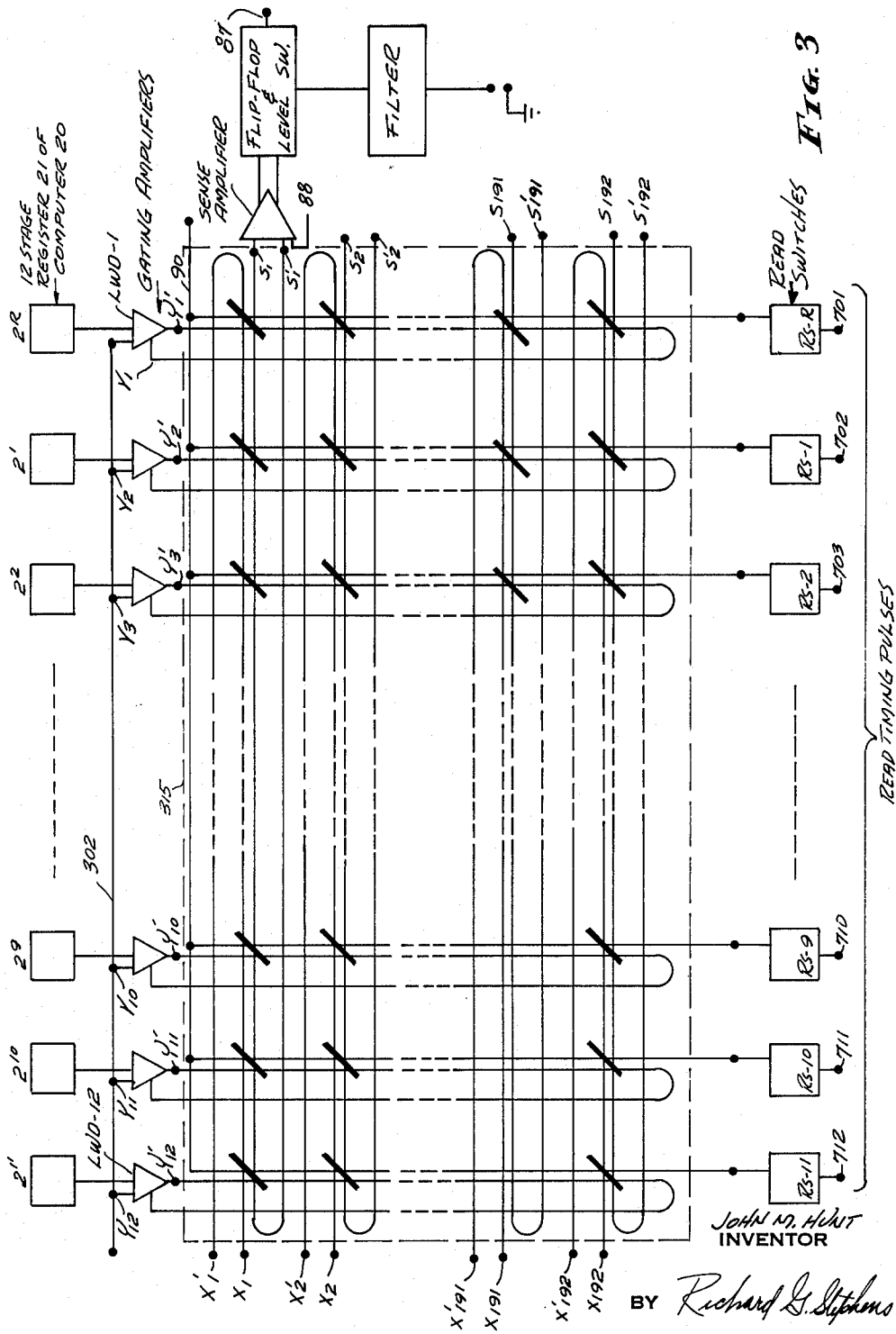

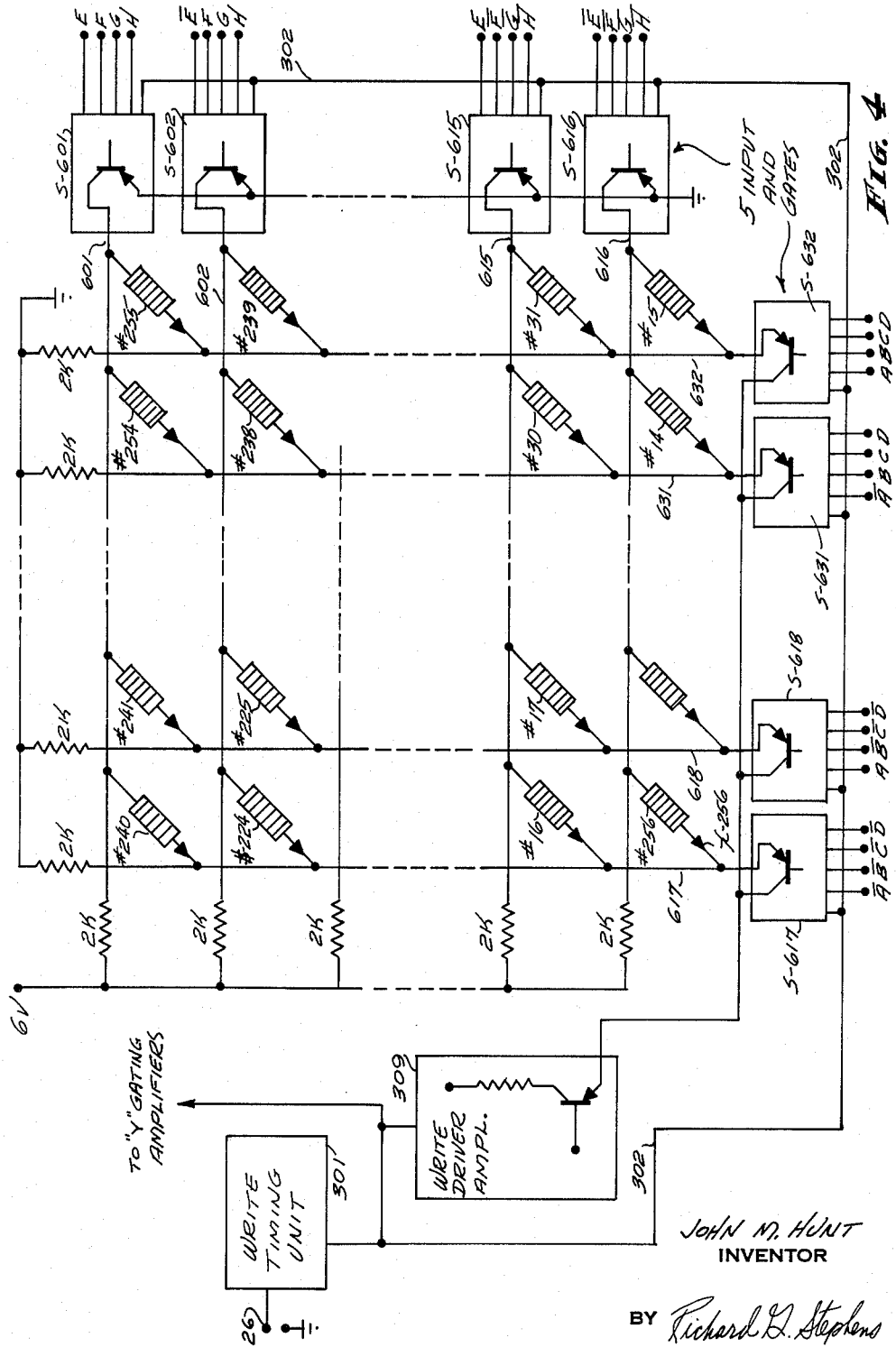

May 31, 1966    J. M. HUNT    3,254,337
DATA CONVERSION SYSTEM
Filed Feb. 21, 1963    10 Sheets-Sheet 7

JOHN M. HUNT
INVENTOR

BY Richard D. Stephens
ATTORNEY

May 31, 1966

J. M. HUNT 3,254,337

DATA CONVERSION SYSTEM

Filed Feb. 21, 1963

JOHN M. HUNT
INVENTOR

BY Richard D. Stephens
ATTORNEY

JOHN M. HUNT
INVENTOR

May 31, 1966  J. M. HUNT  3,254,337
DATA CONVERSION SYSTEM
Filed Feb. 21, 1963  10 Sheets-Sheet 10

JOHN M. HUNT
INVENTOR

BY Richard D. Stephens
ATTORNEY

United States Patent Office 3,254,337
Patented May 31, 1966

3,254,337
DATA CONVERSION SYSTEM
John M. Hunt, Hillcrest, N.Y., assignor to General Precision, Inc., Binghamton, N.Y., a corporation of Delaware
Filed Feb. 21, 1963, Ser. No. 260,218
13 Claims. (Cl. 340—347)

This invention relates to data conversion systems, and more particularly to an improved digital to analog converter which employs "time weighing" rather than conventional "resistance weighing" in order to convert a digital signal to an analog signal.

In the electronic computer, automatic control, and instrumentation arts, an increasing number of machines and processes are being controlled and indications obtained by means of digital computation. Because the ultimate control and indicating devices, such as motor driven valves, electric meters, and the like are generally responsive to analog signals, a large number of installations wherein digital computation is employed require digital to analog conversion equipment to convert the computed output digital signals to corresponding analog signals.

Digital computers are generally resorted to in preference to analog computers when it is desired to attain a very high degree of computational accuracy, and, in order that the inherent accuracy of digital computation be available in the final analog output signal, it is obvious that the digital to analog converter employed also exhibit a comparable high degree of accuracy. Further, since many machines and processes, and in particular "on-stream" controllers and "real-time simulators," require calculation of relatively rapidly changing variables, it is usually necessary that the digital-to-analog converter be fast as well as accurate. Additionally, as is well known in the design of any electronic equipment, the digital to analog converter should be reliable and economical both to construct and to maintain.

According to the prior art, digital to analog converters, in general, operate by connecting precisely controlled reference voltages representing a digital 1 or a digital 0 to a matrix of summing resistors, with a different resistor selected for each bit of the digital word. Further, each resistor has a different value which is weighed in accordance with the significance of its associated bit position. As is well known, such prior art digital to analog converters become extremely difficult and expensive to design when it is desired to convert digital numbers having approximately ten significant bits, or more, since the tolerance requirements of the individual resistors becomes extreme.

Additionally, in most digital computer control applications, it is generally necessary that a plurality of digital words be converted to their respective analog signals, and, in order to effect a saving in overall equipment, the digital to analog converter is operated in a multiplexed fashion, that is, a single digital to analog converter successively converts each individual digital word to its corresponding analog signal. For the reason that no single digital word is being continuously converted, it is necessary in such prior art multiplexed systems, to employ analog "sample and hold" circuits, which are frequently unreliable, inaccurate, and expensive.

According to the present invention, however, there is provided an improved digital to analog converter, wherein time weighing, rather than resistance weighing, is employed. The concept of time weighing differs from resistance weighing in that, rather than scaling precision resistors in accordance with the significance of its associated digital bit, the precision reference voltage, corresponding to the value of a particular bit, is coupled to the analog output terminal for a time interval corresponding to the significance of the particular bit. By way of example, the least significant bit, LSB, is coupled to the output terminal for one time unit, the LSB+1 bit for two time units, the LSB+2 bit for four time units, the LSB+3 bit for eight time units, etc. In this manner no extreme precise resistors are required, regardless of the number of significant bits in the digital word being converted. Further, since the analog output channel requires, essentially merely a flip-flop, a transistor switch, and an RC filter, it becomes economically feasible to employ individual digital-to-analog converters in each analog output channel when a number of digital words are to be converted, thereby completely eliminating the analog "sample and hold" circuits and other difficulties inherent in any multiplex system.

In a preferred embodiment of the invention to be described in detail below, a plurality of digital words are read out of an output register of a digital computer, or the like, and loaded serially by word into a buffer memory device. Next, the memory device is interrogated to convert all of the digital words simultaneously, serially by bit, commencing with the least significant bit and terminating with the most significant bit. It should be noted, and this is an important feature of the invention, that even though the memory device cannot be loaded and interrogated at the same time, the invention operates to load new digital words into the memory device during the time interval the most significant bit of all of the previously loaded words, which as indicated above require the greatest conversion time, are being converted, so that loading and conversion proceed, in part, at the same time. In this manner, a succeeding conversion cycle commences essentially at the same time a preceding conversion cycle terminates.

It is an object of the invention, therefore, to provide an improved digital to analog converter.

Another object of the invention is to provide a digital to analog converter employing time weighing rather than conventional resistance weighing.

A further object of this invention is to provide an improved digital to analog converter which eliminates the use of extremely precise resistance tolerances, regardless of the number of significant bits in the digital word being converted.

Still another object of the invention is to provide a digital to analog converter wherein the value of each bit of the digital word being converted is coupled to an analog output terminal for a time interval dependent on the significance of the bit.

Yet another object of the invention is to provide a digital to analog converter which eliminates the necessity of multiplexing, when a number of digital words are to be converted, in a simple and economical manner.

Another object of the invention is to provide a digital to analog conversion apparatus wherein a number of digital words to be converted are loaded, parallel by word, into a memory device and then all of said words are interrogated and converted serially by bit into respective analog signals.

A still further object of the invention is to provide digital-to-analog apparatus wherein a plurality of digital words are simultaneously and cyclically converted into respective analog voltages.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and the objects of the invention reference should be had to the following detailed description taken in connection with the accompanying drawings, in which:

FIG. 1 is a block diagram illustrating a preferred embodiment of the digital-to-analog converter of the present invention, also illustrating its interconnection with a digital computer.

FIG. 3 is an electrical schematic diagram, partially in block form, illustrating in greater detail the magnetic core buffer memory portion of the invention, together with auxiliary electronic switching circuits utilized to read data words into and out of the buffer memory portion;

FIG. 4 is an electrical schematic diagram illustrating a diode matrix decoder which may be used as the decoder unit shown as block 307 in FIG. 1;

FIG. 6 is an electrical schematic diagram of a gating and driving amplifier unit which may be used as each of the load write driver "Y" gating amplifier units of FIG. 1;

Figure 2D:
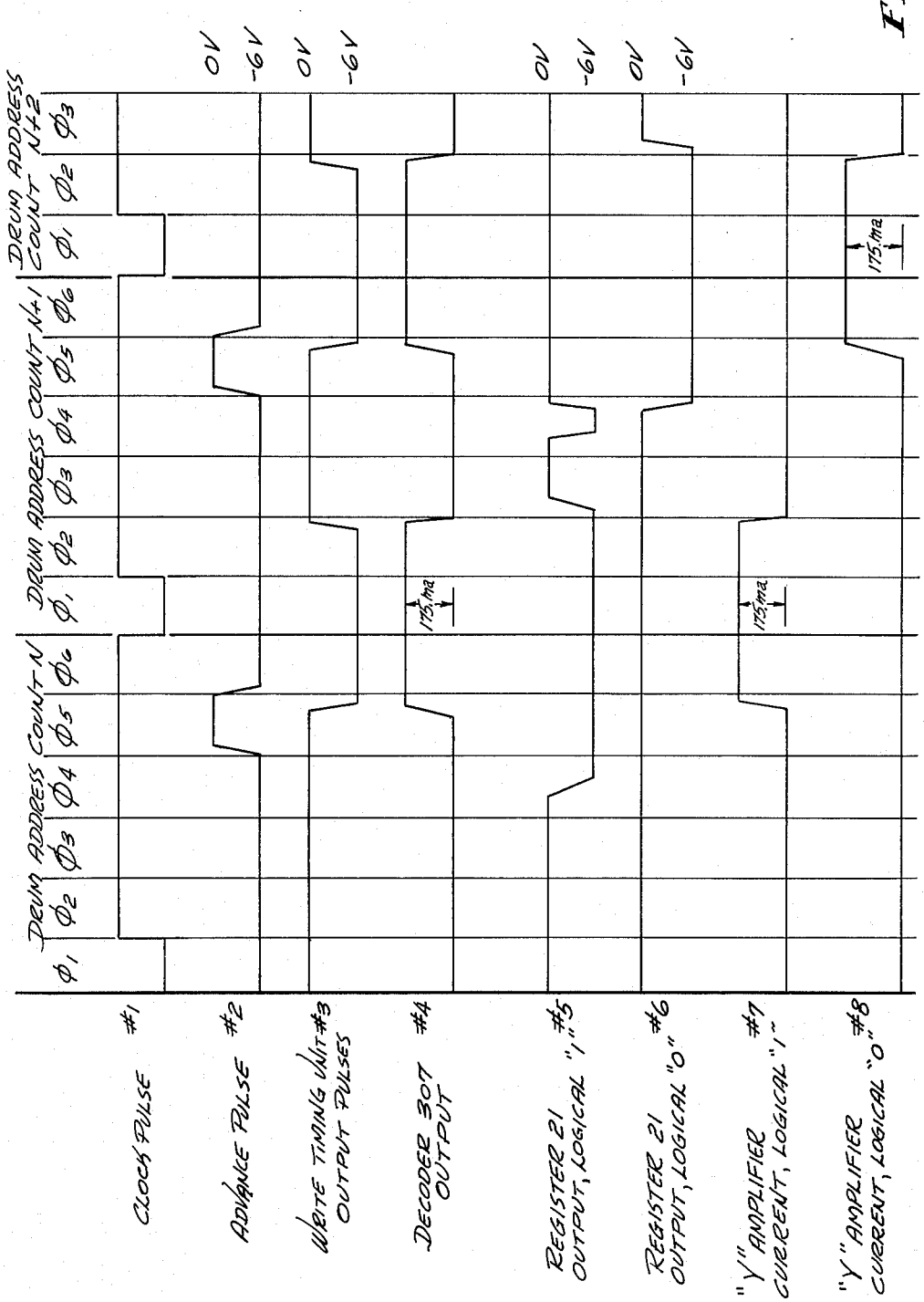
FIG. 2a is a timing diagram illustrating the sequence of certain operations performed by the invention during one revolution of a magnetic storage drum in a digital computer.
FIG. 2b is a timing diagram illustrating the timing of certain pulse signals derived during a portion of one revolution of a magnetic storage drum in the digital computer shown in FIG. 1, which are useful in understanding how data is read out of the memory device of the invention.
FIG. 2c is a timing diagram including a plurality of waveforms useful in understanding how input digital data words are written into the memory device of the invention.

Referring now to the drawings, FIG. 1 illustrates a preferred embodiment of the invention in block diagram form together with a digital computer of the type disclosed in copending application Serial No. 261,248 filed February 21, 1963, on behalf of John M. Hunt and assigned to the assignee of the present invention. As shown in FIG. 1, a digital computer indicated as block 20 includes an output register 21 into which the digital words to be converted to analog voltages are placed by conventional digital computer circuits. In the preferred embodiment of the invention, output register 21 is capable of storing a 12-bit word. Register 21, in a typical application, comprises twelve individual flip-flops, however, register 21 is intended to symbolize any one of a variety of data word locations in a digital computer, from which successive data words may be read out, parallel by bit, serial by word. Further, the digital words from computer 20 each originally may comprise an arbitrary number of significant binary bits. However, in the preferred embodiment of the invention as described herein, only ten significant magnitude bits plus a round-off bit and a sign bit are converted into an analog voltage, it being understood that the invention is readily adaptable to convert any desired number of significant bits.

Twelve output lines indicated collectively as cable 19 in FIG. 1, connect an output signal from each of the stages of register 21 to twelve individual Y gating amplifiers, LWD-1 to LWD-12, only two of which are shown. A detailed description of one form of suitable gating amplifier is given below in connection with FIG. 6. Each of the gating amplifiers is also connected via line 302 to receive an enabling pulse from a write timing unit 301, and upon occurrence of a write timing pulse on line 302, each of the gating amplifiers operates either to energize or not energize a particular vertical input wire of a special 12-by-192 bit core memory matrix 315, depending upon whether the bit applied to it from its associated stage of register 21 is a "1" or a "0." The write timing unit is controlled by "advance" pulses on line 26 from computer 20, and one form of suitable write timing unit is described below in detail in connection with FIG. 7. Each "advance" pulse on line 26 also steps or advances an eight-stage binary "load" counter 305, which provides a parallel digital number output via sixteen lines (shown collectively as cable 18) to decoder unit 307. Decoder unit 307 operates essentially in the manner of a selector switch, operating to energize a particular horizontal row of cores in memory 315 in accordance with the instant count in load counter 305. One suitable form of decoder is explained below in connection with FIG. 4.

Digital words are written into core memory 315 by the coincident current technique. Each core in memory 315 is provided with a first input winding connected to one of the Y gating amplifiers, which provides approximately one-half of the current required to switch the magnetic state of each core in the column of cores to which it is connected. As shown in FIG. 3, gating amplifier LWD-1 is provided with two output terminals $Y_1$ and $Y'_1$ which are connected to a vertical wire winding which passes through all 192 cores of the right-hand column of cores as viewed in FIG. 3. Each of the other eleven gating amplifiers is similarly connected to a respective column of 192 cores. Each core in memory 315 is also provided with a second input winding driven by the output of decoder 307 to provide an equal amount of current. As shown in FIG. 3 core array 315 is provided with 192 horizontal or X write windings, each of which passes through all 12 cores in its associated row of matrix 315. The terminals of the first X write winding are labelled $X_1$ and $X'_1$ in FIG. 3. The terminals of each of the 192 X write windings are connected to decoder 307 so that the X write windings are energized individually and successively as load counter 305 is advanced. Like the vertical write windings the horizontal write windings also supply only one-half of the magnetization necessary to switch the magnetic state of a core. If only one of the two input or write windings of a given core are energized, the magnetic state of the core does not switch, but if both the vertical and horizontal input windings of a given core are simultaneously energized, the core will switch to a given magnetized state, and then remain magnetized in that state until a readout or reset process occurs. As successive advance pulses from computer 20 cycle counter 305, successive 12-bit words are stored in memory 315 in consecutively grouped sets of cores, at successive word data addresses. Being provided with 192 horizontal 12-bit rows of cores, memory 315 acts as a buffer storage medium for as many as 192 12-bit input words switched into it from register 21 of computer 20.

Figure 5:
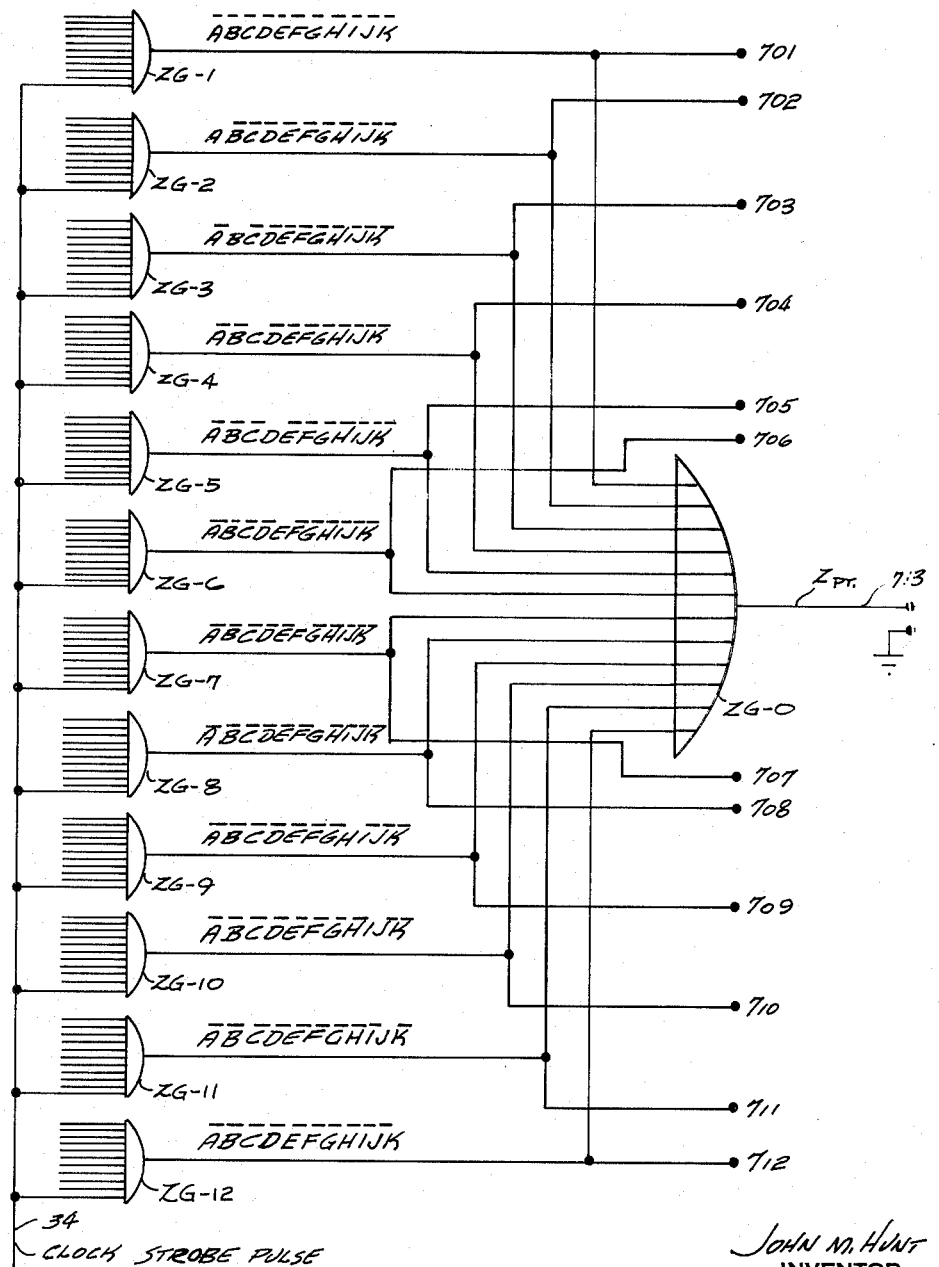
FIG. 5 is a schematic logic diagram partially in block form illustrating one form of read timing logic unit which may be used as block 70 in FIG. 1.

Though all 12 bits of a word are written into core memory 315 simultaneously, they are read out serially by bit and parallel by word, by read timing circuitry to be described in detail. Read timing logic, shown in block form as 70 in FIG. 1 and in detail in FIG. 5, is operated by drum address counter 24 of computer 20, to generate a series of 12 timed pulses which are spaced apart in a binary progression. The twelve timed pulses are applied individually via 12 output lines 701 to 712, to 12 transistor read switches (RS–R and RS–1 to RS–11) connected to twelve vertical "unload" or "read" wires, each of the wires being strung through all 192 cores of a respective column of core memory 315. In FIG. 3 each of the 12 "unload" or "read" windings of core memory matrix 315 are shown connected between conductor 90 and a respective "read" switch. The twelve read timing pulses are also "OR"ed together in circuit 70 and applied via read timing driver amplifier circuits 50 and line 90 to the other ends of the 12 read windings, so that individual ones of the 12 read windings are energized when the 12 read timing pulses occur. When a read timing pulse is applied to the vertical read wire associated with a given core, the core will be switched to its "0" magnetic state if it is not already in that state. If the core is in the "1" magnetic state and its read winding is energized to switch it to the "0" state, rate of change of flux in the switched core induces an output voltage of a given magnitude in a "sense" winding threading the core. However, if the core is already in the "0" state, a lesser flux change occurs, and a much lesser (preferably zero) amplitude output pulse appears at the sense winding output terminals. In the preferred embodiment being described, output voltages of approximately 40–50 millivolts are obtained when a magnetized core (i.e., a core in the "1" state) is read, while less than 6 millivolts output occur upon interrogation of a core in the "0" state. The sense windings of all 12 cores in a given row are connected in series. The terminals of the sense winding through the first row of cores are labelled $S_1$ and $S'_1$ in FIG. 3. As the 12 read windings of the cores in row No. 1 are successively energized, output pulses will appear between sense winding output terminals $S_1$ and $S'_1$ associated with that row for each "1" bit theretofore stored in the cores of the No. 1 row. Thus the 12 bits comprising a given data word are read out serially in a time-weighed sequence, with each bit weighed according to its significance, by the timing of the read pulses applied to the read windings of core memory 315.

The series of pulses from the sense winding of each row is connected, preferably through a twisted pair (to reject noise) to a respective sense amplifier (SA–1 to SA–192 in FIG. 1) and utilized to control a respective flip-flop (FF–1 to FF–192). The sense amplifiers each function as threshold determining devices, being biased so as to ignore the low amplitude output voltages induced in the sense windings when a core being read is in the 0 state, but provide a sufficient output voltage to switch the associated flip-flop when the core being read is in the 1 state. Each sense amplifier includes a monostable multivibrator output stage which provides a negative-going set output pulse of predetermined duration on a first line when a 1 input is applied, and additionally, the sense amplifier provides a positive-going reset output pulse of predetermined duration on a second output line upon the application of a 1 input. When the 12th, or round-off bit column is read, by energization of read switch RS–R, each of those data words having a "1" in its round-off column will provide an output pulse on its associated sense winding, thereby switching its corresponding flip-flop to a first stable state (if it is not already in that state), while those flip-flops associated with words having "0" roundoff bits are switched to the second stable state (if they are not already in that state). The state of each flip-flop is connected to control a respective transistor switch (TS–1 to TS–192 of FIG. 1), to gate a first precision reference voltage to a respective RC filter circuit (FC–1 to FC–192) when the flip-flop is in the first state, and to gate a second reference voltage to the filter circuit when the flip-flop is in the second state. The 192 waveforms applied to the 192 filter circuits, each comprising time weighed pulses of uniform amplitude, are averaged by the filter circuits to provide 192 analog output voltages.

In the invention, all timing is based upon and controlled by the basic machine cycle of digital computer 20, which as indicated in FIG. 1, is derived from the rotation, at constant speed, of magnetic storage drum 200. Drum 200 is driven at 2400 r.p.m., making a complete revolution every 1/40th of a second. Each track around the circumference of drum 200 is arranged to contain 4096 data bits, and thus an individual bit time or machine cycle, is 6.105 microseconds. The 4096 pulses around one track of drum 200 are read by read head 23, and utilized to advance a conventional 12-stage binary counter 24 designated the "drum address" counter, which cycles through its total count of 4096 once during each drum revolution, and hence the instantaneous count in drum address counter 24 is an indication of instantaneous drum position. The 4096 bit spaces around drum 200 are given drum address numbers from A0000 to A4095. As will be apparent from FIG. 2a, during the first quarter of each drum revolution, as drum address counter 24 counts from addresses A0000 to A1024, the invention simultaneously converts to analog form 192 digital words which were read from computer register 21 during the fourth quarter-cycle of the preceding drum revolution. During the second quarter of each drum revolution, as drum address counter 24 counts from drum addresses A1024 to A2048, 192 new digital words are read from register 21 into core memory 315. The 192 new digital words are simultaneously converted to analog voltages during the third quarter of each revolution which lasts throughout drum address counts A2048 to A3072, a further group of 192 digital words being read from register 21 during the fourth or last quarter of a revolution, from A3072 to A4095. It will be seen that two complete readout and conversion cycles are completed during each drum revolution, and hence the basic conversion frequency is 80 cycles per second.

As mentioned above, twelve "read timing" pulses are generated during both the first and third quarter-cycle to provide a binary time-weighing of the twelve digits of the data words being converted. As will be explained, each read timing pulse is used to determine whether a given bit position in each of the stored data words is "1" or "0," and to control the generation of an accurate amplitude pulse (of one voltage level or another voltage level depending upon whether the bit was "1" or "0") for a time period which is weighed in accordance with the bit significance, and upon filtering of the twelve pulses obtained during each conversion cycle, an analog output voltage is obtained. Thus during the first quarter of each drum revolution, twelve read timing pulses are generated, during the following drum address counts:

A0000  A0001  A0002  A0004  A0008  A0016
A0032  A0064  A0128  A0256  A0512  A1024

If the least-significant bit of a data word is "1," the read timing pulse generated during drum address count A0001 will cause the generation of a precision-amplitude pulse (for example, +10 volts) which lasts one machine cycle, until drum address count A0002. If instead the least-significant bit is "0," a minus 10-volt pulse will be generated during the A0001 to A0002 machine cycle. If the next least significant bit of the word is "1," occurrence of the read timing pulse at A0002 will cause a +10-volt pulse to be generated for two machine cycles, from A0002 to A0004. In similar fashion, the succeeding read timing pulses cause plus pulses or minus pulses to be generated in accordance with whether succeeding more significant bits are "1" or "0," for time periods which are scaled in accordance with bit significance. The read timing pulse generated at the end of the first quarter (A1024) of a drum revolution causes a +10-volt pulse to be generated for 1024 machine cycles (from A1024 to A2048) the entire second quarter of a revolution if the most significant digit of the data word is "1."

In the 12-bit binary word, the most significant bit will represent the positive or negative sign of the quantity, the next 10 bits will represent the absolute value of the quantity, and the final bit will merely provide a roundoff. The analog output signal is derived from the 12-bit binary word by an integrating filter means which essentially sums the weighed values of the binary bits. Since the input levels may be either a positive or a negative 10 volts, the analog output signal may likewise be positive or negative in polarity. The most significant bit representing the sign information is weighed 1,024 times the weight of the least significant bit, and as such will cause the analog output signal to be positive or negative in polarity corresponding to the positive or negative sign of the digital input quantity. Thus, the most significant bit representing the sign may be expressed as $2^{10}$ power as compared with the least significant bit which is $2^0$ power. A simplification of this apparatus has been accomplished by giving the roundoff bit an equal weight to the least significant bit of the absolute value quantity. Therefore, it may be appreciated that the least significant bit of the absolute value quantity and the roundoff bit are both weighed as $2^0$, and the more significant bits weighed accordingly—the weighing of the various bits being accomplished by varying the time intervals during which the voltages are impressed upon the integrating filter means. It may be noted that the invention is loading new data words into its core memory during the second quarter revolution while simultaneously converting the most-significant digit of each of the data words loaded one-half revolution before. It will be readily apparent from the above list of drum address counts that the time between successive read timing pulses increases in accordance with a binary progression. Similarly, during the third quarter of each drum revolution, when a further conversion cycle is occurring, twelve further read timing pulses are generated during the following address counts:

A2048  A2049  A2050  A2052  A2056  A2064
A2080  A2112  A2176  A2304  A2560  A3072

The second series of read timing pulses may be seen to be spaced in accordance with an identical binary progression. In the two above-listed series of drum address counts at which read timing pulses are generated, it may be noted that each binary series is preceded by a first time period equal to the least-significant bit time period. For example, the A0001 to A0002 period (one machine cycle) is preceded by the A0000 to A0001 period, which also lasts one machine cycle, and similarly, the A2049 to A2050 time period (one machine cycle) is preceded by the A2048 to A2049 period, which also lasts one machine cycle. During these two initial machine cycles which precede the binary-increasing series of time periods, no +10-volt pulses are generated. Thus in any conversion cycle, regardless of the digital word being converted, the pulse train begins with a minus pulse indicating a "0" bit for one machine cycle (6.105 microseconds). Provision of this minus pulse interval at the beginning of each pulse train will be seen to simplify the relationship between the pulse train total area and the digital word being converted if one considers the nature of a fractional binary code. Assuming an eleven-bit data word, the significance of the various bits will be seen to be as follows:

.1    1    1    1    1    1    1    1    1    1    1
½   ¼   ⅛   ¹⁄₁₆  ¹⁄₃₂  ¹⁄₆₄  ¹⁄₁₂₈  ¹⁄₂₅₆  ¹⁄₅₁₂  ¹⁄₁₀₂₄  ¹⁄₂₀₄₈

Regardless of the number of digits provided in the fractional binary code, the number never equals 1.000, but is always less than unity by an amount equal to the least significant digit. Even if all eleven bits of the word are "1," the value of the binary number is 1.000 minus $1/2^{11}$.

Now it may be seen that the blank or "no pulse" cycle provided at the beginning of each pulse train corresponds to the $1/2^{11}$ or approximately .049% minimum least significant digit amount by which unity must exceed the digital number. If the initial blank machine cycle were not provided, the analog output voltages would each exceed by .049% the established relationship, wherein 1 volt equals .100, 5 volts equal .500, etc., and hence the disclosed arrangement considerably simplifies system scaling. Now the nature of the waveforms applied to the output filters may be apparent. Each waveform lasts throughout one conversion cycle (one-half drum revolution) and comprises an initial minus pulse for one machine cycle to represent the 1/2048 or .049% by which the analog output voltage never reaches full scale, and then eleven plus or minus pulses (depending upon whether the eleven bits of a word are "1" or "0"), with each one of the succeeding plus or minus pulses having twice the duration of its predecessor. The entire conversion consumes 2048 machine cycles, and upon completion of one conversion cycle another conversion cycle begins immediately.

If the transistor switches (TS–1 to TS–192 of FIG. 1) are connected to apply either +10 volts or zero volts to their respective filters, it will be seen that the analog output voltages obtained will always be positive. It is quite possible, and within the scope of the invention, to sum a negative bias or offset voltage with the output voltage from each filter so that the resultant outputs may be either positive or negative. For example, if offset voltages of minus five volts are summed with the filter output voltage, by means of conventional summing amplifiers (not shown), resultant voltages ranging from −5 volts to +4.999 volts will be obtained from digital input words, all of which are positive.

If the digital numbers to be converted include a sign bit, however, plus a plurality of magnitude bits, the invention may be used to provide analog output voltages varying properly in magnitude and polarity without the use of bias voltages, by translating each digital number to a revised form before conversion and by connecting opposite polarity, reference voltages to the transistor switches and such an arrangement is shown herein. Suppose X equals a fractional binary number between 000 . . . and .99999 . . . (decimal) having eleven significant magnitude bits, plus a sign bit to indicate whether it is positive or negative. If unity is added algebraically to X and then the sum halved, the result X' will be seen always to be positive.

$$X' = \frac{X+1}{2}$$

Thus if the result of a computation within computer 20 is a fractional binary number X which is either positive or negative, X may be translated to X' and the latter stored in register 21. If X is zero, X' will be ½. If the digital number .100000 . . . (i.e., decimal ½) is set in register 21, it will be seen that the transistor switch will apply +10 volts to the filter during one-half of a conversion cycle (1024 address counts) and will apply −10 volts to the filter during the other half of the cycle, resulting in zero output volts from the filter. If X is positive, X' will be greater than ½, so that the transistor switch will apply plus voltage to the filter for a longer time than negative voltage, resulting in a net positive voltage output from the filter. Conversely, if X is negative, X' will be less than ½, so that the transistor switch will connect negative voltage to the filter for a longer time than positive voltage, providing a net negative analog voltage output from the filter. The specific embodiment of the invention shown herein utilizes this technique for providing output voltages of either polarity which are correct in both magnitude and polarity. Since adding unity to a fractional binary number and then halving the sum are standard arithmetic operations and may be accomplished in computer 20 with a variety of known alternative circuits, a detailed explanation of circuitry for translating X to X' need not be set forth herein.

In practice, the most significant bit of the digital quantity is indicative of the sign such that a binary 0 is indicative of a positive quantity and a binary 1 is indicative of a negative quantity. If the quantity is positive, the first bit may be complemented or inverted and combined with the remainder of the bits to provide a positive output quantity. On the other hand, should the sign bit be a binary 1 indicating a negative value, the sign together with all of the numerical bits will be complemented in accordance with the 1's complement. In the case of a positive quantity, the sign bit alone will be inverted, and in the case of a negative quantity, all of the bits will be inverted. Mathematically, this is equivalent to the relations described above wherein the fractional binary number is added to unity and then halved.

In FIG. 2b, the first eleven drum address counts of a drum revolution are shown in an expanded scale. The drum address clock pulses derived by read head 23 and applied to advance drum address counter 24 are shown as waveform #1, and the five read timing pulses generated during this period (A0000 to A0011) are shown as waveform #2.

For convenience in understanding the details of and some of the refinements in the timing of the invention, each 6.105-microsecond basic machine cycle may be regarded as consisting of six successive time periods each approximately one microsecond in duration, with the six periods designated $\phi_1$ through $\phi_6$ for identification. A clock pulse is recorded during phase $\phi_1$ of each basic machine cycle around one track of magnetic drum 200 as shown by waveform #1 of FIG. 2b. Read head 27 reads the clock pulses, driving single-shot multivibrator SS-1 (see FIG. 1), which generates an output pulse of 0.5 microsecond duration for every clock pulse. The trailing, positive-going edge of the SS-1 output triggers a second monostable multivibrator SS-2, which provides a positive-going 4.5-microsecond output pulse on line 34. As will be further explained below, the SS-2 output pulses, designated "clock strobe pulses," are used to strobe read timing logic 70 to prevent spikes which might otherwise occur due to circuit inequalities.

Referring again now to FIG. 1, assume that a 12-bit data word output exists in output register 21 of digital computer 20. Upon receipt of an "advance" pulse from computer 20 via line 26, write timing unit 301 provides a write timing pulse via line 302 to the plurality of gating "Y load-write" driver amplifiers shown in detail in FIG. 6. As shown by waveform #2 of FIG. 2c, the advance pulses from computer 20 are arranged to occur during the $\phi_5$ phase of those machine cycles when they do occur, and to have a duration of approximately 1 microsecond. Each advance pulse on line 26 will be seen from waveform #3 of FIG. 2c to cause write timing unit 301 to provide a negative-going pulse of $3\mu$ sec. duration, which lasts throughout the $\phi_6$ phase of the cycle in which it is generated and extends into the $\phi_1$ and $\phi_2$ phases of the next machine cycle. The advance pulse on line 26 also is applied to load counter 305, which applies a parallel binary number via 16 wires represented collectively at 18 (in FIG. 1) to decoder unit 307. The negative-going $3\mu$ sec. write timing pulses on line 302 are also applied to decoder unit 307. Unit 307 provides a "load" signal input to one of 192 horizontal or "X" wires of core memory 315, the particular X wire energized being dependent upon the count in load counter 305. Inasmuch as decoder 307 is also controlled by the write timing pulse on line 302, the load signal applied to a selected row of cores occurs in synchronism with the $3\mu$ sec. output pulses on line 302, as indicated by waveform #4 in FIG. 2c.

The connection of the Y load driver amplifiers and the X wire inputs to core memory 315 is shown in more detail in FIG. 3. In the specific embodiment described, the input data from computer 20 is arranged to appear in register 21 for intervals of approximately 4.5 microseconds beginning during the $\phi_4$ phase of one drum address count and lasting through the $\phi_2$ phase of the next drum address count, as shown by waveforms #5 and #6 in FIG. 2c.

During the time $\phi_4$, the sign bit is interrogated to determine whether the analog voltage will be positive or negative. If the sign bit is 0, indicating that the quantity is positive, then the sign bit itself will be complemented and changed to a 1 bit, but all of the remaining numerical bits will be passed unchanged. On the other hand, if the sign bit is binary 1, indicating that the quantity is negative, the sign bit together with all of the remaining bits will be complemented in accordance with the 1's complement. In a 1's complementing operation, each of the bits is inverted such that all of the binary 0's become binary 1's, and all of the binary 1's become binary 0's.

In FIG. 2c, the waveforms #5 and #6 are shown extending through two address drum count intervals wherein each drum address count includes the six phases $\phi_1$ through $\phi_6$. The waveform #5 is representative of two digital 1's, while the waveform #6 is representative of two digital 0's. During the first count N, it is assumed that the sign bit has been interrogated and determined to be a binary 0 indicating a positive quantity, but during the second count N+1 the sign bit was interrogated and found to be a binary 1 representative of a negative quantity. Thus, the waveforms #5 and #6 indicate four different conditions—the binary 1 of both the positive and negative quantities and the binary 0 of both positive and negative quantities. In each case, the interrogation of the sign bit occurs during the interval $\phi_4$ and the readout is accomplished during the next time interval $\phi_5$.

In the first case, shown by the curve #5 during the drum address count N, the wave drops negatively during the interval $\phi_4$, and because no complementing operation is called for, the wave will remain negative to provide a binary 1 output during the interval $\phi_5$. The wave #6 remains at 0 volts representative of a binary 0 continuously through the entire interval of the drum address count N, and there is no complementing operation because the sign bit has been determined to be positive. In the third case, the wave #5 during the drum address count N+1 represents the condition of a binary 1 input which must be complemented because the sign bit has been interrogated and the quantity has been determined to be negative. During the interval $\phi_4$ (count N+1) the wave #5 drops negatively indicative of a binary 1, but immediately thereafter will invert this wave such that during the next $\phi_5$ the output wave will be a binary 0. The final case represents a binary 0 input which must be complemented because the quantity has been determined to be negative (wave #6 during drum address count N+1). In this case, the initial value of the wave during the interval $\phi_4$ was 0 volts, but the complementing operation caused the voltage to drop to a negative 6 volts such that the readout during the interval $\phi_5$ will be representative of a binary 1.

If the zero-th bit in the $2^R$ stage of register 21 is "1," the energization of line 302 with a write timing pulse causes Y gating amplifier LWD-1 to provide an output current having half the magnitude necessary to switch the magnetic state of all 192 cores in the column of cores associated with LWD-1. If instead the zero-th bit in the register 21 is "0," amplifier LWD-1 provides no current through its associated vertical wire. All of the other load-write amplifiers operate similarly, and hence it will be seen that half the required core-switching current will be applied through the cores of all vertical columns of cores associated with 1 bits of the word in register 21, while no current will be applied through the other vertical columns of cores. If load counter 305 is at its "001" (decimal) count position, unit 307, under control at write timing unit 301, applies one-half of the required switching current to the $X_1$ horizontal row of cores in memory array 315, as more particualrly hereinafter described, and hence only those cores of the $X_1$ row whose vertical wires are energized by 1 bits in register 21 have sufficient current to be switched to the 1 state, all of the remaining cores in array 315 remaining in the 0 state. In this manner, the parallel 12-bit word contained in register 21 is transferred to the $X_1$ row of cores. Next, upon receipt of a further advance pulse from the computer signifying that a new word is present in register 21 and should be read, counter 305 and units 307 and 301 energize the $X_2$ horizontal row of cores, storing the new word in the $X_2$ row upon energization of line 302. As additional advance pulses are received from computer 20, additional words are written in successive horizontal rows of the core array, up to a maximum of 192 words. "Home" pulses are derived from drum 200 by head 29 at drum address counts A1024 and A3072, which mark the beginning of the two loading cycles, and the home pulses are applied via line 31 to reset load counter 305 to its zero count at the beginning of each loading cycle.

The "advance" pulses connected to operate write timing unit 301 and to advance load counter 305 are shown in FIG. 1 as being derived from control circuit 37, which may take a variety of different forms depending upon the precise nature and use of digital computer 20. It may be noted, however, that no data words are attempted to be read out of register 21 unless an advance pulse is generated by control circuit 37, and hence that the reading out of the data words into the D/A converter is always under the control of computer 20. In a number of applications the data address symbolized by register 21 actually may comprise a data location which is accessible only by one circuit element at a time, and in such arrangements it may be important that readout for D/A conversion not interfere with an access needed for an internal computation within digital computer 20. For example, register 21 might actually comprise a random-access core memory used for much of the internal computation and execution of a specified program within computer 20 or the accumulator of an arithmetic unit within computer 20. Since the readout of the successive data words into the D/A converter of the present invention need not occur at a fixed and uninterrupted rate, the readout easily may be made to occur at time periods during which none of the other elements of computer 20 require access to the data location symbolized by register 21.

Decoder 307 comprises a form of diode matrix decoder which may be understood by reference to FIG. 4. Decoder 307 is a 256-position selector switch although only 192 positions are utilized and its effective to "half-energize" a particular one of the 192 horizontal rows of cores in memory 315 in response to a particular count in load counter 305. Matrix 307 includes 16 horizontal input lines, 601 to 616, each of which is connected to a respective transistor switch, S–601 to S–616, and 16 vertical input lines, 617 to 632, each of which is also connected to a respective transistor switch, S–617 to S–632. Binary load counter 305 includes eight binary stages, each of which is provided with a set and a reset output line. The set outputs of the eight stages are labelled A through H, beginning with the least significant stage, and the reset output lines are similarly labeled $\overline{A}$ through $\overline{H}$. Inasmuch as load counter 305 may comprise a completely conventional 8-stage binary counter (with a reset capability), no detailed explanation of load counter 305 is necessary.

Each of transistor switching units S–601 through S–616 comprises a five-input AND gate which is connected to an individual group of four output lines from counter 305 and to the write timing pulse on line 302. Similarly, each of transistor switching units S–617 through S–632 comprises a five-input AND gate connected to the write timing pulses and to an individual group of four of the counter 305 output lines.

When the count in load counter 305 is zero (decimal), or $\overline{A}\ \overline{B}\ \overline{C}\ \overline{D}\ \overline{E}\ \overline{F}\ \overline{H}$, the now energized lines $\overline{E}\ \overline{F}\ \overline{G}\ \overline{H}$ of the four higher order stages of counter 305 operate transistor switch S–616 (upon the occurrence of the write timing pulse on line 302), and the now energized lines $\overline{A}\ \overline{B}\ \overline{C}\ \overline{D}$ of the four lower stages of counter 305 simultaneously enable transistor switch S–617. All of the other transistor switches associated with the decoder are disabled at this time. Upon occurrence of write timing pulse on line 302, transistor switch S–617 connects the X-line current pulse from the X-line driver amplifier 309 through the collector and emitter of the transistor in switch S–617 to line 617. In like manner, switch S–616 simultaneously energizes line 616. Connected between horizontal line 616 and vertical line 617, and in series with diode X–256, are the twelve windings of one row, row 192 by way of example indicated by reference numeral 256, of the 192 X rows of core memory 315, and thus upon occurrence of a zero count in load counter 305, driver amplifier 309 is connected to apply current through the cores of X row No. 192. As the count in load counter 305 changes in response to the "advance" pulses which occur from time to time during a "loading" quarter revolution of drum 200, different core rows in the 192-row core memory are "half-magnetized." As typified by the coding shown in detail of those 5-input AND gates shown specifically, the inputs to the AND gates are arranged so that only one of the AND gates of the S–601 to S–616 group and only one of the AND gates of the S–617 to S–632 group will be enabled at a time. Therefore, only one horizontal conductor and only one vertical conductor of the decoder matrix will be simultaneously energized so that the decoder thereby "half-magnetizes" only one 12-core group of cores, i.e., only one horizontal row of cores, in memory 315. It should be noted that use of the 16-by-16 decoding matrix allows the selection of any one of as many as 256 core rows, and hence a larger core memory could be used, if desired. The 64 unused matrix positions are grouped together for convenience and sake of simplicity, so that core rows Nos. 1 through 192 are successively energized as the count in load counter 305 varies from 0 to 191 (decimal) and as the count in load counter 305 varies from 192 to 255 no horizontal rows of cores are energized. At the beginning of each loading cycle, i.e., at drum address counts A1024 and A3072, a "home" pulse derived from read head 29 energizes the reset line of load counter 305, resetting counter 305 to a zero count. When a given row of cores is selected by a given count in counter 305 the diodes of the decoder matrix prevent unwanted parallel paths, or "sneak" circuits, from being formed, so that only a single row of cores will be excited during any given count in counter 305. As will now be evident, each of the 192 rows of cores in core memory 315 are connected between an individual pair of horizontal and vertical wires of the decoding matrix, and hence as load counter 305 is advanced by successive advance pulses from the digital computer, the 192 core rows are successively "half-energized."

Drum address counter 24 (see FIG. 1) comprises 12 binary stages, each stage having a "set" and a "reset" output line, and as successive clock pulses are applied to counter 24 it counts repeatedly in binary fashion up to 4096 (decimal). Inasmuch as drum address counter 24 may comprise a completely conventional binary counter, no detailed description of its internal circuits is necessary. As mentioned above, there are 4096 bit spaces around a single track of drum 200, so that the instantaneous count in counter 24 is an indication of instantaneous drum position. As is well-known, any given stage of a conventional binary counter goes through twice as many cycles as its adjacent higher order stage, and hence the first 11 stages of counter 24 goes through two complete cycles in one drum revolution. Since there are two complete loading and conversion cycles during each drum revolution, it will be seen that the first 11 stages of counter 24 cycle are in synchronism with the loading and conversion operations.

The eleven "set" output lines and the eleven "reset" output lines from the eleven last-significant stages of drum address counter 24 are indicated collectively in FIG. 1 as cable 25 and shown connected to the read timing logic circuit 70, which is shown in detail in FIG. 5. The "set" outputs from the eleven least-significant stages of counter 24 are labelled individually with the letters A through K in FIG. 5, the zero-th set output being labelled "A" and the $2^{10}$ set output being labelled K. The "reset" outputs of the same stages of counter 24 are labeled $\overline{A}$ through $\overline{K}$ in corresponding fashion. The condition after counter 24 has been reset to zero may be indicated by the following Boolean expression:

$$\overline{A}\ \overline{B}\ \overline{C}\ \overline{D}\ \overline{E}\ \overline{F}\ \overline{G}\ \overline{H}\ \overline{I}\ \overline{J}\ \overline{K}$$

After application of one input pulse to counter 24 the condition of counter 24 will be A $\overline{B}\ \overline{C}\ \overline{D}\ \overline{E}\ \overline{F}\ \overline{G}\ \overline{H}\ \overline{I}\ \overline{J}\ \overline{K}$, with the lowest-order stage set, but all other stages still reset. After application of a second input pulse the counter condition will be $\overline{A}$ B $\overline{C}\ \overline{D}\ \overline{E}\ \overline{F}\ \overline{G}\ \overline{H}\ \overline{I}\ \overline{J}\ \overline{K}$. It will be seen that as successive input count pulses are applied to counter 24, that the count numbers which provide ten reset conditions and a single set condition vary in a binary progression. For example, the A and B stages of the counter are set respectively after the first and second input pulses as mentioned above. The C stage, and only the C stage, is set after 4 input pulses, the D stage alone after 8 input pulses, etc., up to the K stage which will be the only stage in a set condition after 1024 input pulses have been applied to counter 24. Each of these conditions of counter 24 wherein all stages except one are reset is sensed by a gating circuit and used to provide a pulse in a "read timing pulse train" which is used to read data out of magnetic core array 315. The read timing pulse train ($Z_{pt}$) may be described as follows:

$$Z_{pt} = Z_R + Z_0 + Z_1 + Z_2 + Z_3 + Z_4$$
$$\phantom{Z_{pt} = }0 \quad 1 \quad 2 \quad 4 \quad 8 \quad 16$$
$$\phantom{Z_{pt} = } + Z_5 + Z_6 + Z_7 + Z_8 + Z_9 + Z_{10}$$
$$\phantom{Z_{pt} = }\ 32\ \ 64\ 128\ 256\ 512\ 1024$$

Below each term in the above expression a number indicates the pulse count of counter 24 at which the term will provide a 4.5-microsecond pulse in the pulse train. As shown in FIG. 5, the read timing pulse train may be provided by connecting all the set and reset output lines of counter 24 to twelve AND gates ZG-1 to ZG-12 with the outputs of the AND gates connected through an OR gate ZG-0. As shown in FIG. 3, the twelve individual read timing pulses on lines 701 to 712 are connected individually to read switches RS-R, RS-1 to RS-12, to selectively enable the switches during the occurrence of their respective read timing pulses, and thereby allow read driver circuit 50 to apply current (via line 90) selectively through the 12 read windings of core memory 315. Current will be seen to be applied through a given read winding upon coincident enabling of its respective read switch and occurrence of an output pulse on line 90 from read driver circuit 50. Being gated by the 4.5-microsecond output pulses in the read timing pulse train, the read switches are enabled for 4.5 microseconds periods. Read driver circuit 50 is triggered by the leading edges of the read timing pulses in line 713, and provides slightly narrower output pulses, of approximately 3 microseconds width, substantially centered within the read timing pulse intervals, as shown by waveform #3 in FIG. 2b. The output pulses which occur from cores being read during the reading of several logical "1's" and several logical "0" are shown by waveform #4 in FIG. 2b. The output pulses from a sense winding associated with a given row of cores are used to set or not set a respective sense amplifier, as mentioned above. As will be evident from waveforms #6 and #7 of FIG. 2b, the large amplitude core output pulses which result from reading a logical "1" result in a positive-going pulse on one output line of the amplifier and a negative-going pulse on the other output line of the amplifier, while the relatively small or insignificant pulses obtained upon reading logical "0's" fail to produce any output pulses from the sense amplifier. A 4.5-microsecond clock strobe pulse on line 34 from single-shot multivibrator SS-2 is also connected to each "and" gate of circuit 70 to determine the width of the output pulses from circuit 70 and to prevent spikes from appearing in either any single read timing pulse or in the read timing pulse train itself. Inasmuch as pulses of accurately uniform 4.5-microsecond width are provided from mutli-vibrator SS-2 and used to gate the read timing logic, spikes which otherwise might occur in the outputs from FIG. 5 due to inequalities in rise and fall times and erroneously trigger read driver circuit 50 are eliminated. As mentioned above, the 4.5-microsecond clock strobe pulses on line 34 are generated by multivibrators SS-1 and SS-2, which in turn are driven by the drum clock pulses occurring during the $\theta_1$ phase of each machine cycle, thereby locating each 4.5-microsecond pulse in the read timing pulse train susbtantially in the center phases of each machine cycle, as indicated by waveform #2 in FIG. 2b.

The read timing pulse train on line 713 is connected to trigger further timing circuits shown in block form in FIG. 1. Each pulse in the read timing pulse train triggers a first monostable or "single-shot" multivibrator SS-3, which provides a 2.5-microsecond output pulse, the trailing edge of which is used to trigger a second single-shot multivibrator SS-4, which provides positive-going pulses of 1.5 to 2.0 microseconds duration which are delayed behind the leading edges of the sense amplifier output pulses. These positive-going pulses are inverted by three stages of power amplification represented by block 52, providing read timing strobe pulses on line 87 in FIG. 1, of a nature shown by waveform #8 in FIG. 2b. The read timing strobe pulses on line 87 are connected to gate the set and reset inputs of flip-flops FF-1 to FF-192 and transistor switches TS-1 to TS-192. Inasmuch as the strobe pulses on line 87 are delayed behind the leading edges of the sense amplifier output pulses, none of the flip-flops which are switched will be switched until the amplifier set and reset lines have reached their peak signal levels, and therefore all transistor switches which are going to switch will switch at the same time, thereby insuring uniform widths in the pulses applied to the filters even if fairly substantial differences exist in the rise and fall time between the 192 sense amplifiers, and hence it is unnecessary to make all of the amplifier dynamic characteristics absolutely identical. It will be seen from waveform #9 in FIG. 2b that when the flip-flops and transistor switches are switched, switching occurs upon occurrence of the read timing strobe pulses on line 87. In FIG. 2b waveform #9 indicates the nature of the pulse train which would occur from a given transistor switch if the data word being converted consisted of alternate "1's" and "0's."

Figure 9:
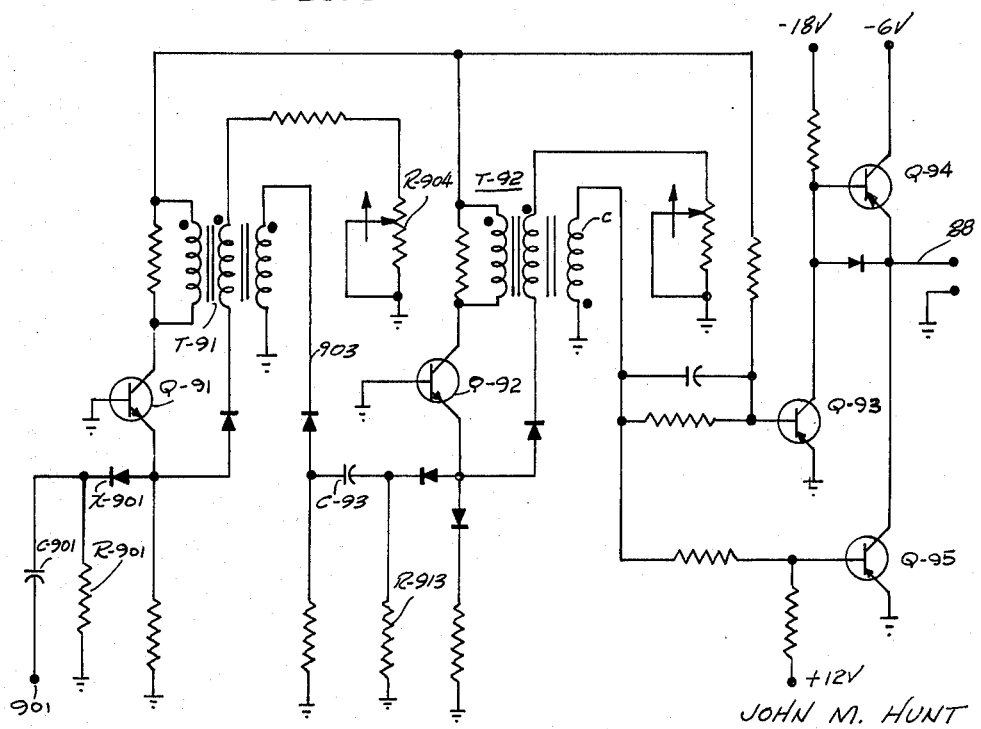
FIG. 9 is an electrical schematic diagram illustrating a strobe pulse generator and power amplifier which may be used as blocks 51 and 51a of FIG. 1.

To further insure that uniform width pulses are obtained for conversion, the signals applied from the magnetic core memory output windings to their associated sense amplifiers (SA-1 to SA-192) are strobed by pulses applied via line 88 to each of the sense amplifiers. The pulses of the read timing pulse train on line 713 are applied to read timing and driver circuits indicated as block 50 in FIG. 1 and shown in detail in FIG. 11. A delayed pulse generated on line 91 operates strobe pulse generator 51 and its associated power amplifier 51a, the details of which are shown in FIG. 9, to provide a 0.8-microsecond wide strobe pulse to gate the input signals applied from a given core output winding to its associated sense amplifier. The timing of the strobe pulses is indicated by waveform #5 in FIG. 2b. The strobe pulses on line 88 are delayed approximately .6 microsecond behind the leading edges of the pulses on line 90, and hence behind the beginning of the output pulses generated upon reading the cores, so that the pulses from all of those cores which are simultaneously inducing an output voltage have time to reach substantially their peak values before they are gated into the sense amplifiers, thereby tending to obviate slight timing differences which otherwise could occur from different cores having different rise and fall characteristics.

As shown in detail in FIG. 6, each of the 12-Load-Write driver or Y gating amplifier circuits comprises a 2-input nand gate including diodes X-2 and X-3, an inverter Q-1 and a power driver stage Q-2, which can furnish 175 ma. output drive current. In the quiescent state of operation, one or both of the input signals is zero volts, the base of transistor Q-1 is reverse biased and Q-1 therefore is cut off. The output of Q-1 clamped at —6 volts by diode X-1, and as a result transistor Q-2 is forward biased by the —6 volt level input and is saturated. The collector voltage of transistor Q-2 is approximately +3.0 volts and effectively reverse biases the base of transistor Q-3, thereby cutting off Q-3. The input signals to diodes X-2 and X-3 are negative-going pulses, and during the interval of their coincidence both diodes are back-biased. Transistor Q-1 now is forward-biased and its collector voltage increases to approximately —0.5 volt. Transistor Q-2 now is reverse-biased and cut off. The Q-2 collector voltage tends to fall toward the —18-volt supply level but is held at approximately —0.5 volt by the base-to-emitter drop of Q-3 as it begins conduction. Transistor Q-3 then conducts for the duration of the coincident time interval between the write timing pulse on line 302 and the bit from one of the stages of the digital computer output register 21, and the output current from transistor Q-3 is connected as shown to half-magnetize all 192 write windings of its associated column of cores.

Figure 7:
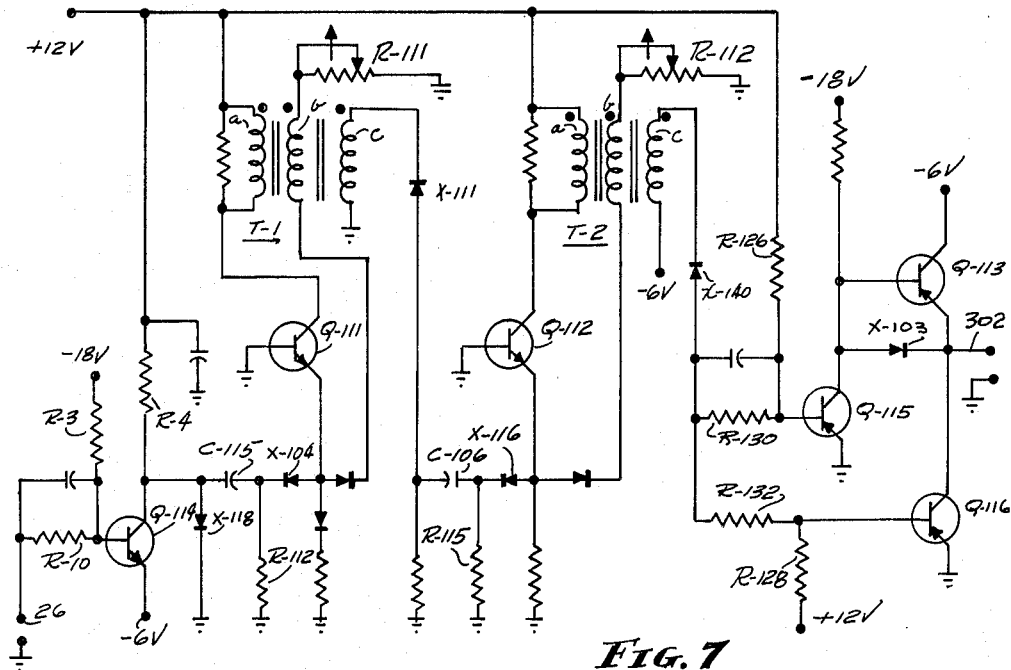
FIG. 7 is a detailed electrical schematic diagram illustrating one form of a write timing unit which may be used as block 301 of FIG. 1.

Write timing unit 301 of FIG. 1 is shown in detail in FIG. 7 to comprise an inverter stage, two blocking oscillators, and a power amplifier stage. The inverter stage comprises transistor Q-114, resistor R-4 and the input biasing resistors R-3 and R-10. An RC differentiating circuit comprising capacitor C-115 and resistor R-112 provides the triggering signal for the first blocking oscillator, an emitter-controlled type which includes Q-111, transformer T-1, and resistor R-111. The output pulse width from this blocking oscillator is set by resistor R-111 and this pulse width determines the time by which the leading edge of the output pulse is delayed from the leading edge of the input pulse, and the delay is set at 1.0 microsecond. The second blocking oscillator, which includes transistor Q-122, transformer T-2 and resistor R-112, has an output pulse width which provides a circuit output pulse of 3.0 microseconds. The power amplifier stage inverts the 3-microsecond blocking oscillator output and is coupled to line 302 which drives the 12 "load-write" driver circuits (LWD-1 to LWD-12) and the 32 decoder and load switch circuits.

The input signal to the write timing unit is the advance pulse on line 26 from the digital computer 20, and comprises a positive-going pulse of 6 volts. In the absence of the advance pulse, the input line 26 remains at —6 volts, biasing the base of transistor Q-114 more negative than its emitter, so that transistor Q-114 is at cutoff, with a small collector current $I_{co}$ flowing. The output of Q-114 at its collector is clamped at approximately zero volts by clamping diode X-113. Transistors Q-111 and Q-112 of the two blocking oscillators are cut off, and transistors Q-115 and Q-116 of the power amplifier stage are conducting. This latter action results since resistors R-126 and R-128, each of which are connected to the positive twelve volt power supply, are of equal magnitude, and R-130 and R-132 also are of equal magnitude. Note also should be made of the fact that diode X-140 is connected through winding c of transformer T-2 to the negative six volt power supply. By properly scaling the ratio of the resistance of resistors R-130 and R-132 to the resistance of resistors R-126 and R-128, the base electrode of each of transistors Q-115 and Q-116 are maintained at about minus one volt with respect to ground. The output voltage on line 302 is approximately zero volts, and transistor Q-113 is cut off since its emitter is more negative than its base by the amount of forward conduction drop of diode X-103.

Figure 10:
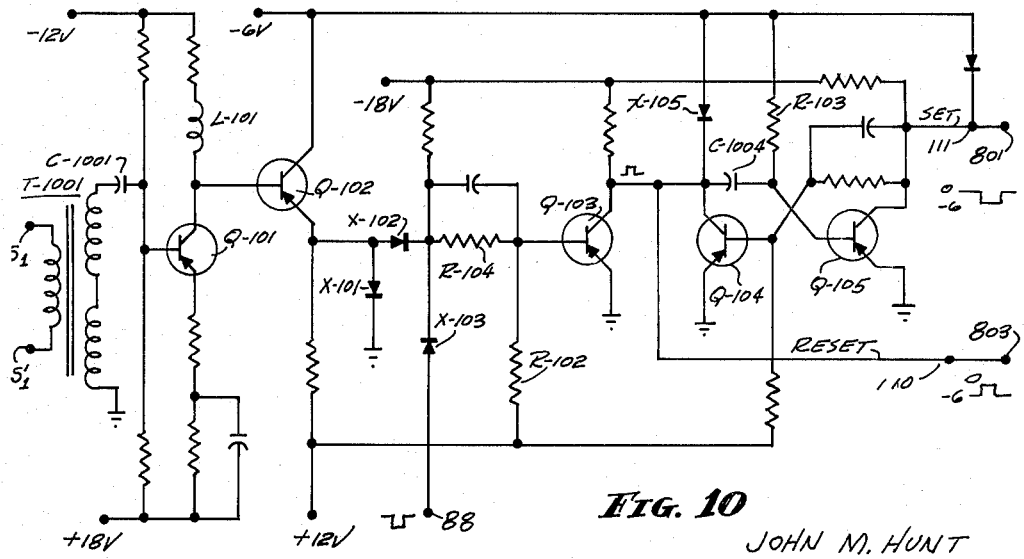
FIG. 10 is an electrical schematic diagram illustrating a sense amplifier which may be used as blocks SA-1 through SA-192 of FIG. 1.

The positive-going advance pulse on line 26 turns on transistor Q-114 for the duration of the pulse. Transistor Q-114 saturates, so that its collector falls to approximately —6 volts, and a positive-going pulse is obtained at the Q-114 collector. This pulse is differentiated by C-115 and R-112, and the leading edge negative spike is coupled through diode X-104 while the trailing edge positive spike is blocked. The negative spike forward biases the emitter base junction of Q-111, thereby causing current flow through winding a of transformer T-1, and this current pulse through winding a is coupled regeneratively by winding b so that regeneration occurs. The output from winding c in the first blocking oscillator is a 1-microsecond positive-going pulse, the duration of which is adjusted by the setting of potentiometer R-111. The positive pulse leading edge is blocked by diode X-111, but its trailing edge negative backswing is differentiated by C-106 and R-115, and the resulting negative spike is coupled via diode X-116 to the emitter of Q-112, triggering the second blocking oscillator, which operates in the same manner as the first, but which provides a 3-microsecond positive-going output pulse to reverse bias the bases of Q-115 and Q-116, cutting them off. At that time transistor Q-113 will begin to conduct and help decrease the fall time of the output pulse. Transistor Q-113 also will clamp the negative-going output pulse on line 302 at approximately —6 volts. In the exemplary sense amplifier shown in detail in FIG. 10 the input terminals $S_1$ and $S'_1$ from the X-1 row of cores are connected to the primary winding of a voltage step-up transformer T-1001 and the output from the transformer is capacitively coupled through capacitor C-1001 to the base of an inverter amplifier transistor Q-101. Choke L-101 in the collector path of transistor Q-101 serves as a peaking coil to accentuate the leading edges of the negative-going pulses on the Q-101 collector when a 1 pulse applied to transformer T-1001 is effective to cut off transistor Q-101. The output voltage from the Q-101 collector is applied to an emitter follower stage comprising transistor Q-102, and the emitter of Q-102 is clamped at zero volts by diode X-101. Diodes X-102 and X-103 and resistor R-102 form a negative "and" circuit in which the input signal is "anded" with the strobe pulses applied via line 88. Line 110, the collector terminal of transistor Q-103 is clamped at —6 volts by diode X-105 during the quiescent state. Upon coincidence of a negative-going pulse from Q-102 (signifying readout of a logical "1") and a negative strobe pulse on line 88, the negative signal applied to the base of amplifier transistor Q-103 via resistor R-104 provides a positive-going output pulse of approximately 6 volts on the sense amplifier reset output line 110. Transistors Q-104 and Q-105 and associated components comprise a monostable multivibrator, and during the quiescent state transistor Q-104 is cut off and transistor Q-105 is conducting, so that set output line 111 lies at approximately zero volts. The mentioned positive pulse on the Q-103 collector is applied via capacitor C-1004 to the Q-105 base, cutting off Q-105 and turning on Q-104 for the time required for capacitor C-1004 to discharge through resistor R-103. Cutting off transistor Q-105 causes its collector voltage to drop, thereby providing a negative-going pulse on line 111. Diode X-105 prevents the collector from going more negative than —6 volts. The single-shot multivibrator is arranged to reset itself in approximately 2.8-microseconds; before the positive pulse disappears from the Q-103 collector. Thus if a logical "1" input pulse is applied to the sense amplifier of FIG. 10, a negative-going "set" pulse of approximately 2.8-microsecond duration and 6 volts amplitude will be provided at set output 111, and a positive-going "reset" pulse of approximately 4-microsecond duration and 6 volts amplitude will be provided at reset output line 110.

The "set" pulse on the line 111 is generated by the conduction interval of the transistor Q–105, and the "reset" pulse on the line 110 is generated by the cut off interval of the transistor Q–104. These pulses have different time durations because the capacitor C–1004 will tend to hold the transistor Q–104 at cut off for an interval after the transistor Q–105 cuts off and returns to its quiescent state. After cut off of the transistor Q–105, a finite time must elapse while the capacitor C–1004 charges to approximately the six-volt differential between the collector of transistor Q–104 and the base of the other transistor Q–105.

The transistor Q–101 is biased by resistor networks coupled between the −12 volt power source and the +18 volt source to provide a predetermined threshold permitting a positive pulse to cut off the transistor Q–101 and to generate a negative pulse to bias the transistor Q–102 into conduction. A pulse sensed by a core being flipped from a binary 1 is considerably greater and of longer duration than the rather insignificant pulse which results from reading logical zeros. Strobe pulses of comparative short duration are impressed upon the terminal 88 and an AND circuit including diodes X–102 and X–103. The timing of the strobe pulses is such as to coincide with the long duration pulses from switching a core when a binary 1 is sensed, but the strobe pulses do not coincide with the smaller output signals resulting from reading logical zeros which are of short duration. Thus, the pulses from the core memory must be of a sufficient minimum amplitude and duration to provide a coincidence with the strobe pulses, and as a result the binary 1's gate the strobe pulses through the AND circuit but the binary 0's fail to gate the strobe pulses. The circuit of transistor Q–103, therefore, responds only to binary 1 pulses and will be insensitive to binary 0 pulses. The set and reset terminals 111 and 110 of each sense amplifier are connected to the input terminals 801 and 803 of a respective flip-flop and transistor switch circuit of the nature shown in FIG. 8.

Figure 8:
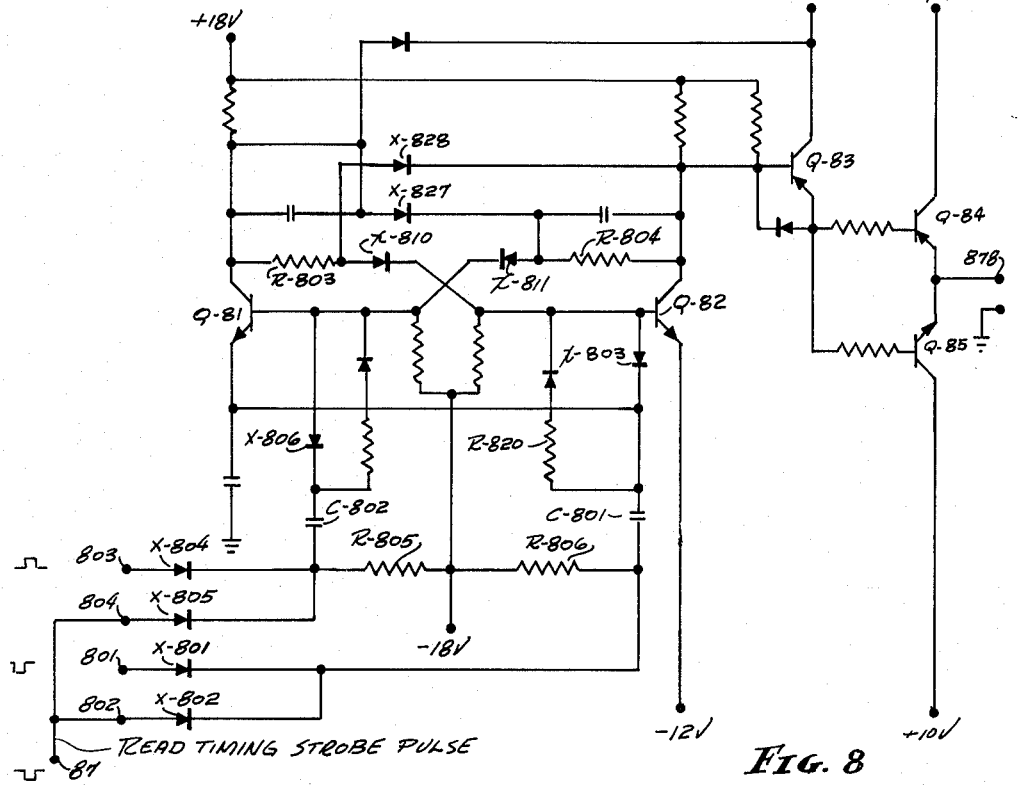
FIG. 8 is an electrical schematic diagram illustrating a flip-flop and a transistor switch which may be used as blocks FF-1 through FF-192 and TS-1 through TS-192 of FIG. 1.

The flip-flop and level switch circuit shown in FIG. 8 comprises a bi-stable flip-flop connected to drive a complementary emitter follower transistor switch. The flip-flop comprises a pair of transistors Q–81 and Q–82, and an emitter follower driver amplifier Q–83 connects the flip-flop output to the switch comprising transistors Q–84 and Q–85. As mentioned above, each sense amplifier is provided with a set output line carrying negative-going output pulses and a reset output line carrying positive-going output pulses. The set output line from the associated sense amplifier is connected to terminal 801, and the reset output line connected to terminal 803. The negative-going read timing strobe pulses on line 87 are connected to a further set terminal 802 of the flip-flop and to a further reset terminal 804. The two set inputs to the flip-flop are seen to be applied via terminals 801 and 802, through a pair of diodes X–801 and X–802, which together with resistor R–806 form an AND gate, through coupling capacitor C–801 and diode X–803 to the base of transistor Q–82. The two reset input signals are applied in similar fashion via terminals 803, 804, diodes X–804 and X–805 which together with the resistor R–805 form yet another AND gate, capacitor C–802 and diode X–806. The collector signal of transistor Q–81 is connected via resistor R–803 and diode X–810 to the base of transistor Q–82, and the collector signal of transistor Q–82 is connected to the base of transistor Q–81 via resistor R–804 and diode X–811. In order to prevent saturation of the flip-flop, a pair of germanium diodes X–827 and X–828, and a pair of silicon diodes X–810, X–811 are connected as shown, to provide negative feedback and thereby limit the saturation of either half of the flip-flop, which otherwise might delay flip-flop switching.

When a logical "1" is read out of a core, the associated sense amplifier set output line will carry a 2.5-microsecond pulse, which goes negative (0 to −6 volts) and then later positive (−6 volts to 0). The negative-going read timing strobe pulses on line 87 are made to occur approximately 0.5 microsecond after the leading edge of the sense amplifier output, and therefore, the amplifier output will have time to fall fully before the strobe pulse is applied. As mentioned above, diodes X–801, X–802 and resistor R–806 form a negative "and" circuit, and because the leading edge of the sense amplifier set output and the read timing strobe pulses are both negative-going, and coincident for the duration of a strobe pulse, a negative pulse is differentiated by capacitor C–801 and resistor R–820. Because the sense amplifier reset output line (connected to terminal 803) has gone positive as hereinabove explained, the reset "and" circuit comprising diodes X–804 and X–805 is not enabled, thereby preventing the possibility of a reset pulse being applied through capacitor C–802. The leading edge negative spike across resistor R–820 is coupled to the base of transistor Q–82 through diode X–803, which is effective to block the positive voltage spike resulting from differentiation. If transistor Q–82 is cut off, the negative spike has no effect and Q–82 remains cut off. If Q–82 is conducting, however, the negative spike reverse biases the Q–82 base and cuts off Q–82. The Q–82 collector rises toward the collector supply (+18 volts) and the emitter follower Q–83 follows. The positive-going transition is connected to the base of Q–81 as mentioned above and begins to turn Q–81 on, so that the circuit flips to its opposite stable state. The set output from the collector of Q–82 is clamped at approximately +12 volts by emitter follower Q–83. The application of the set output to the complementary emitter switch, Q–84 and Q–85, cuts off Q–84 and drives Q–85 into heavy saturation, so that both the emitter-base and collector base junctions of Q–85 are forward biased. The output voltage at the common emitter terminal 878, which voltage is applied to an output filter as hereinafter explained, varies by only one or two millivolts from the +10-volt precision reference voltage connected to the collector of Q–85, thereby insuring that all pulses applied to the filters are accurately held to uniform amplitudes. Once a particular flip-flop has been set or reset by a set output or a reset output from its associated sense amplifier, the flip-flop remains in that state at least until the occurrence of the next read timing strobe pulse on line 87. After the flip-flop has been set as described above and the next read timing pulse also provides a set and reset pulse output from the associated sense amplifier, signifying that the second digit is also a 1, the flip-flop remains in its set condition. If the flip-flop is in its set stable state and the next read timing pulse does not provide both a set and reset output from the sense amplifier, the flip-flop is switched to its reset state as next described. When a 0 is read out of core memory array 315, the output pulse applied to sense amplifier SA–1 through SA–192 is below the triggering threshold level so that the set output line 111 remains at zero volts and the reset output line 110 at −6 volts. The read timing strobe pulse on line 87 is "anded" as shown in FIG. 8 with the now negative reset output from the sense amplifier on line 803, and hence the AND gate including diodes X–804 and X–805 is enabled, and passes the negative-going read timing strobe pulse through capacitor C–802 to turn off Q–81 and turn on Q–82, in the same manner as that described above with AND gate including diodes X–801 and X–802. The lower collector voltage now present on Q–82 overdrives the complementary transistor switch, however, now saturating Q–84 and cutting off Q–85, so that the −10-volt reference voltage (less the insignificant millivolt drop across Q–84) is supplied at output terminal 878 to the associated filter.

As mentioned above, the functions of the read timing and driver circuit 50 of FIG. 1 are to generate a delay pulse to drive strobe pulse generator 51 and a strong drive current to be applied to the read windings of magnetic core array 315. As shown in detail in FIG. 11, circuit 50 comprises three inverter stages, a blocking oscillator, and a constant current driver stage. In the specific embodiment described, the driver stage is capable of furnishing 350 ma. of current for 3.0-microsecond periods for the core read windings, despite the back e.m.f. induced by the considerable inductance of each core column.

Figure 11:
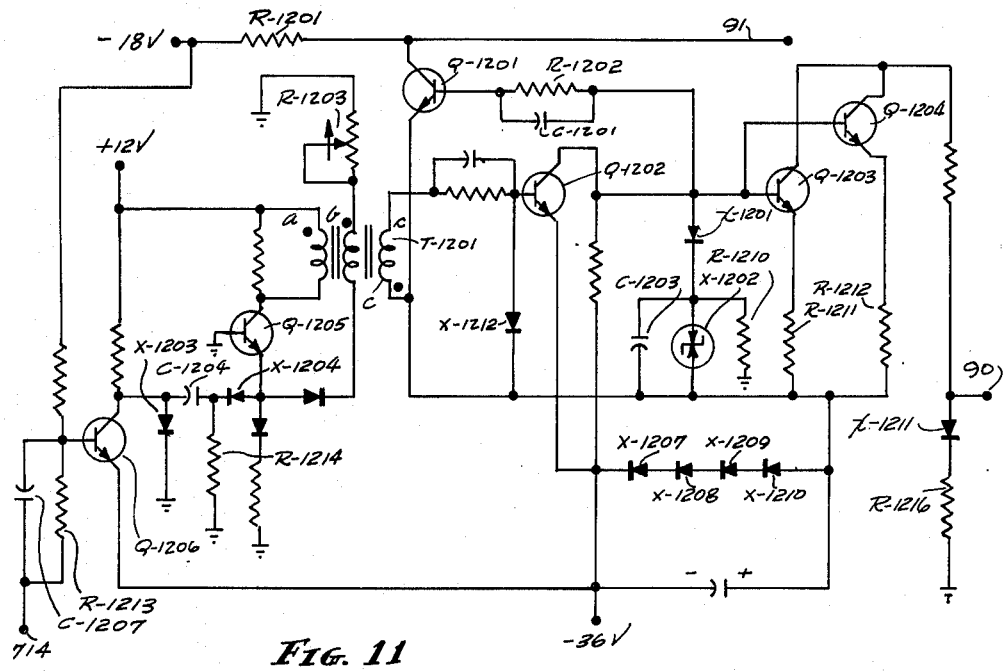
FIG. 11 is an electrical schematic diagram illustrating a read timing and driver circuit which may be used as block 50 of FIG. 1.

The read timing pulses on line 713 are applied at terminal 714 in FIG. 11 thence through the parallel combination of resistor R–1213 and capacitor C–1207, to the base of transistor Q–1206 of the first inverter stage. The second stage, including transistor Q–1205, transformer T–1201, resistance R–1203 and associated components, comprises a blocking oscillator which is triggered by the Q–1206 inverter stage output. The blocking oscillator output signal drives a second inverter stage including transistor Q–1202, which in turn drives both a pair of parallel-connected current driver transistors Q–1203 and Q–1204, and a delayed output inverter stage including transistor Q–1201. Diode X–1212 is connected across the input signal applied to the second inverter stage to prevent that stage from being driven too hard into saturation during the blocking oscillator output backswing, by limiting the voltage at the Q–1202 base during the transient. Four diodes (X–1207 through X–1210) are shown connected in series as a voltage level shifter, to bias transistor Q–1202 to conduction during the quiescent state. Zener diode X–1202, resistor R–1210 and diode X–1201 will be seen to determine the voltage level at which the Q–1202 output signal is clamped during the non-quiescent, or pulse state. The function of diode X–1211 and resistor R–1216 is to clip the backswing transient generated by the inductance of a column of cores when the read current pulse is turned off.

During the quiescent state, the voltage on line 713 connected to terminal 714 is at —6 volts, so that transistor Q–1206 is cut off, and its collector is clamped at ground potential by diode X–1203. Transistor Q–1205 of the blocking oscillator is also cut off. Transistor Q–1202 is forward biased, and has a collector voltage of approximately —35.5 volts. Transistors Q–1203 and Q–1204, and transistor Q–1201 are also cut off. As a positive-going pulse of the read timing pulse train is applied via line 713, it forward biases transistor Q–1206, generating a negative-going 6-volt pulse at its collector. The negative-going pulse is differentiated by capacitor C–1204 and resistance R–1214, and its leading edge applied through diode X–1204 to trigger transistor Q–1205 of the blocking oscillator, thereby generating a 3.5-microsecond negative-going pulse from winding c of transformer T–1201. The negative-going oscillator pulse cuts off inverter transistor Q–1202 and hence its collector rises toward —6 volts. Diode X–1201 clamps the collector output at approximately —21 volts, and a 12–15-volt positive-going pulse is generated, its amplitude being determined by the breakdown voltage of zener diode X–1202, which sets the clamping voltage level. The emitters of transistors Q–1203 and Q–1204 follow the positive-going pulse applied to their bases, and resistors R–1211 and R–1212 are chosen to provide the desired amount of output current to energize a column of cores. The output current on line 90 is connected to all of the columns of cores in memory unit 315 as explained above in connection with FIG. 3.

The positive pulse from the collector of transistor Q–1202 drives transistor Q–1201 into saturation, providing a negative-going delayed pulse on line 91 to operate strobe pulse generator 51.

The suitable form of strobe pulse generator and associated power amplifier which may be used as blocks 51 and 51a in FIG. 1 is shown in detail in FIG. 9. As mentioned above, the strobe pulse generator is triggered from the delay output pulse on line 91 of the read timing and driver circuit 50, and operates to provide a 0.8-microsecond wide strobe pulse on line 88 which is used to strobe the sense amplifier input signals. As shown in FIG. 9, the strobe pulse generator comprises two blocking oscillators and a power amplifier stage. The input signal on line 91 from circuit 50 is applied via terminal 901 to a differentiating circuit comprising capacitor C–901 and resistor R–901, and the negative-going spike resulting from differentiation is coupled by diode X–901 to the emitter of transistor Q–91 of the first blocking oscillator. Both blocking oscillators are of the emitter-controlled type. The first blocking oscillator, which includes transistor Q–91 and pulse transformer T–91, provides output pulses having a duration controlled by adjustment of resistor R–904. The second blocking oscillator includes transistors Q–92 and transformer T–92, providing an output pulse which drives a power amplifier shown as comprising transistors Q–93, Q–94 and Q–95, the power amplifier serving to amplify and shape the output pulse. Transistor Q–94 of the power amplifier is an emitter follower driver amplifier which provides a low impedance drive for the negative-going edge of the output waveform.

In the quiescent state transistors Q–91 and Q–92 both are cut off. Also, transistors Q–93 and Q–95 of the power amplifier are reverse biased and maintained at cutoff. Output terminal 88 will be seen to be clamped at approximately —6 volts by transistor Q–94. Upon application of a negative-going input pulse on line 91, the negative-going spike applied to Q–91 forward biases the Q–91 base-emitter junction and allows emitter current to flow. The emitter circuit applied through transformer T–91 is regeneratively coupled back to the Q–91 collector as shown so that regeneration occurs, and a positive pulse of approximately 0.55-microsecond duration is provided on line 903. The negative-going trailing edge of the pulse is differentiated by capacitor C–93 and resistor R–913 and applied to the emitter of transistor Q–92. The second blocking oscillator operates in the same manner as the first, providing a 0.8-microsecond wide negative-going pulse from winding c of transformer T–92. The negative-going pulse forward biases the bases of transistors Q–93 and Q–95, causing Q–94 to be reverse biased, and hence a positive-going 6-volt output pulse (delayed approximately 0.55-microsecond) is provided at output terminal 88 of the power amplifier stage.

Figure 12:
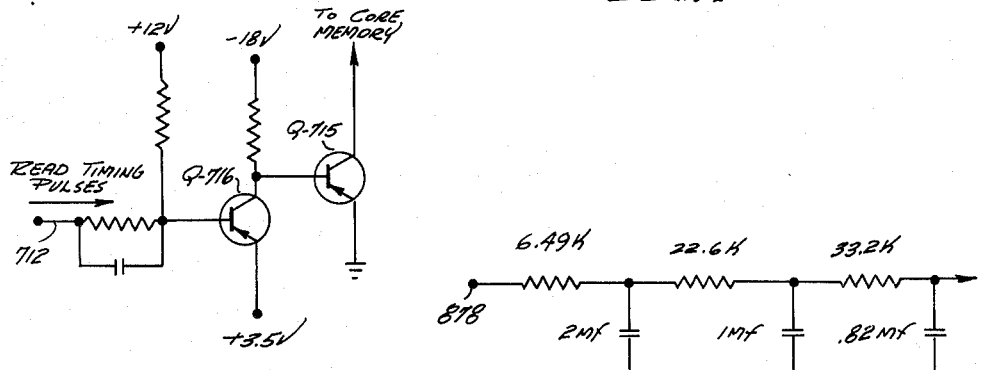
FIG. 12 is an electrical schematic diagram illustrating a read switch which may be used as block RS-R through RS-11 of FIG. 1.

The read switch of FIG. 12 includes a first transistor Q–716 which is normally biased into conduction, and a second transistor Q–715 which is normally nonconductive. Normally, a voltage level of —6 volts is applied to the input terminal 712 to maintain the transistor Q–716 conductive. A read timing pulse applied to the input terminal 712 constitutes a 0-volt level, which may be considered a positive going pulse as compared to the normal negative 6-volt level. Upon application of the read timing pulse to the input terminal 712, transistor Q–716 is cut off, whereupon the base electrode of transistor Q–715 is biased negatively, rendering the transistor conductive in a state of saturation. With the transistor Q–715 conductive, the line to the core memory becomes substantially grounded.

Figure 13:
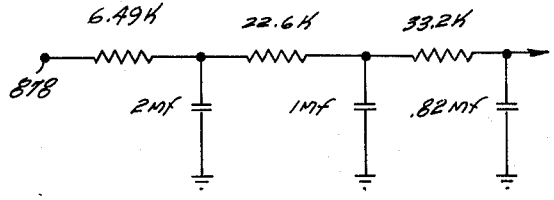
FIG. 13 is an electrical schematic diagram illustrating an RC filter which may be used as blocks FC-1 through FC-12 of FIG. 1.

FIGURE 13 illustrates the averaging circuit for developing analog output voltages. The transistor switches TS–1, TS–2, etc. (see FIG. 1), pass discrete voltage levels of either positive 10 volts or negative 10 volts depending upon the conductive state of the switch. As indicated heretofore, the various numerical bits are weighed with respect to time intervals, and the transistor switch is controlled thereby. The integrating circuit of FIGURE 13 includes a series of RC networks including resistors and capacitors of the specific values indicated, although various other values may be chosen. This circuit is a low pass filter which attenuates higher frequency components of the square wave input signals from the transistor switches. The time constant is such that the attenuation for frequencies on the order of two cycles per second will be —3 decibels. The attenuation for higher frequencies is approximately —18 db per octave. Thus, it may be appreciated that the output voltage from the filter circuit of FIGURE 13 is the average of the time weighed inputs thereto.

While the specific embodiment of the invention disclosed in detail is shown connected to convert the least significant digit of the words first and the most significant digit last, it should be understood that such a sequence is not essential to some forms of the invention. It should be apparent in view of the above disclosure that, if desired, read timing pulses may be generated with time spacings which decrease (rather than increase) in binary (for example) fashion by modifications to read timing logic 70 which will be apparent to those skilled in the art. It is important, however, that some of the bits in the words being converted not be updated before all of the bits have been read. If, for example, the bits of the words are read out of memory 315 most significant digit first, it will be seen that loading in of new words should not be done until all of the less significant bits have been converted, or else the loading in of a different most significant bit would cause an error in the pulse train. Therefore, in some embodiments of the invention, a separate portion of a conversion cycle may be provided during which loading is accomplished and during which no conversion is taking place. For example, a conversion cycle might be established having 2240 drum address counts, with drum address counts A0000 to A2047 used for conversion, with read timing pulses spaced as shown above but with decreasing spacing, and with the portion of the conversion cycle from A2048 to A2240 used solely for loading new words into the memory. In such an arrangement, of course, no pulses would be generated and applied to the output filters during 192/2240 of each conversion cycle, and hence the output voltages would be lower by such amount. The output voltages then could be rescaled easily, however, by increasing the transistor switch reference voltages by a proportionate amount. The specific embodiment disclosed in detail is generally preferred, however, since the arrangement shown, wherein the most significant digit is read out last, allows loading and conversion to overlap in part, thereby requiring less time for a complete conversion cycle and therefore resulting in a higher system frequency response and improved system accuracy.

Furthermore, while the specific embodiment described in detail converts the digits in the order of their significance, and while a straightforward reading of the stored digits of a word in order (or inverse order) of their significance simplifies analysis and maintenance, it will be seen that since all of the sense windings in a given row of cores are connected in series, and since a pulse of given duration during a given conversion cycle has the same effect on the averaged analog output voltage whether it occurs early in the conversion cycle or late in the conversion cycle, the read timing pulses may be applied to their respective columns of cores in any desired order, the only requirement being that the time space between each pair of read timing pulses be proportional to the significance of one of the bits of the digital input words. Thus it will be seen that the invention also may be used to convert digital words written in biquinary code, excess-three code, 1-2-4-8 binary coded decimal, and various other codes in which the digits can be weighed.

While the specific embodiment disclosed is shown as utilizing a specific form of magnetic core matrix memory, it is important to note that a variety of other known digital computer memory devices may be substituted, it only being necessary that the memory be capable of serial-by-bit read out in an arbitrary time sequence. For example, in some embodiments the memory might comprise a shift register, particularly if large bit capacity is not required. Alternatively, the memory might comprise a recirculating delay line in which different bits are read out during successive passes of data words through the delay line. In those applications where enough time is available, the memory may be loaded serially-by-bit as well as by word. While the memory device disclosed uses destructive readout, one may substitute non-destructive core memories, such as aperture plates or BIAX elements without departing from the invention, by provision of an erase signal before new data is loaded into the memory. Each of the above modifications, and a variety of others will be readily apparent to those skilled in the art in light of the above disclosure. It will be apparent that a ring counter could be substituted for binary load counter 305 and decoder 307 without departing from the invention, and that a variety of amplifiers, gate circuits and various pulse circuits may be substituted for those shown in detail.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

I claim:
1. A digital to analog conversion apparatus, comprising:
   means for storing a plurality of multi-bit digital data words, said words including a number of binary bits arranged in a predetermined order of relative significance;
   means operable to complement only the bit of most significance of each multi-bit digital data word prior to storing when said most significant bit is of a first binary value and operable to complement all of said bits of each multi-bit digital data word prior to storing when said most significant bit is of a second binary value;
   a plurality of output terminals, one for each of said words;
   first and second voltage sources;
   sensing means for determining the binary value of each of said bits in said storing means;
   timed switching means for coupling said sensing means to said storing means for a time proportional to the relative significance of each of said bits in said word; and
   switching means coupled to said sensing means for connecting one of said first and second voltages to each of said plurality of output terminals in accordance with the value of the sensed bit for a time interval proportional to the relative significance of said bits.

2. The apparatus of claim 1 wherein said last named switching means is timed by a multi-stage binary counter such that each stage provides an individual output signal time spaced by progressive powers of two.

3. The apparatus of claim 1 wherein said one of said first and second voltage sources is coupled to said output terminals by said connecting means for time intervals proportional to the relative significance of each of said bits and the time interval proportional to each succeeding bit is twice the time interval proportional to each preceding bit when each succeeding bit is greater in significance than each preceding bit.

4. The appaartus of claim 1 wherein said sensing means produces output signals only when said bits have a predetermined magnitude.

5. The apparatus of claim 1 including a plurality of means coupled to each of said plurality of output terminals for restricting the frequency response of voltage signals at each of said plurality of terminals.

6. The apparatus of claim 5 wherein each of said plurality of means comprises a resistance-capacitance low pass filter.

7. Digital-to-analog data conversion apparatus for converting a plurality of multi-bit data words appearing successively in a data word location of a digital data-processing device into a plurality of respective analog voltages comprising, (a) a magnetic core memory device having a first plurality of colums and a second plurality of rows of magnetic cores, an individual write winding and an individual read winding associated with each of said columns, an individual write winding associated with each of said rows, and an individual output winding associated with each of said rows, each of said cores being capable of being magnetized in a given state upon coincident energization of its two associated write windings, and being capable of inducing an output voltage in its associated output winding upon energization of its associated read winding if it previously has been magnetized in said given state;

(b) gating means controlled by advance pulses from said digital data-processing device for selectively energizing said write windings associated with said columns in accordance with the bits of said data word in said data word location;

(c) selective switching means connected to be advanced in synchronism with said advance pulses to energize successively said write windings associated with said rows;

(d) means responsive to periodic pulses from said digital data-processing device for providing a plurality of successive read timing pulses having a time spacing which varies in accordance with the relative significance of successive bits of said digital words and for applying said read timing pulses to respective ones of said read windings;

(e) a plurality of pulse-averaging means; and (f) a plurality of bistable switching means connected to be controlled by said output voltages from respective of said output windings to apply reference voltages of predetermined amplitudes to respective ones of said pulse-averaging means for time periods determined by the time spacing of said read timing pulses, and said plurality of bistable switching means being further connected to be controlled by a timing logic means to apply one of said reference voltages of predetermined amplitude to all of said pulse-averaging means for a time period equal to the minimum spacing between said read timing pulses, thereby to provide a plurality of analog output voltages from said pulse-averaging means.

8. Apparatus according to claim 7 in which said data word location of said digital data-processing device comprises a multi-stage register, and in which said gating means comprises a plurality of coincidence gates connected between individual stages of said register and respective of said write windings associated with said rows of said memory device.

9. Apparatus according to claim 7 in which said selective switching means comprises a binary counter connected to be advanced by said advance pulses to provide successive parallel binary number signals and a decoder operative to energize one of a plurality of decoder output circuits in accordance with said parallel binary number, and means for connecting said decoder output circuits to respective of said write windings associated with said rows.

10. Apparatus according to claim 7 in which said means for providing said successive read timing pulses comprises a binary counter responsive to periodic pulses from said digital data-processing device, and a plurailty of coincidence gates connected to be operated by output signals from said binary counter.

11. Apparatus according to claim 7 in which said plurality of pulse-averaging means comprises a plurality of low-pass filters.

12. Apparatus according to claim 7 in which said plurality of bistable switching means comprises a plurality of flip-flops and a plurality of transistor switches, each of said flip-flops being operative in one state to control a respective transistor switch to apply a first reference voltage to a respective one of said pulse-averaging means, and operative in the opposite state to control said respective transistor switch to apply a second reference potential to said respective one of said pulse-averaging means.

13. Digital-to-analog conversion apparatus for converting a plurality $m$ of successive parallel fractional digital $n$-bit words appearing in a register of a digital computer into a plurality of respective analog voltages comprising, (a) an $m$ by $n$ bit magnetic core memory matrix having $n$ columns and $m$ rows of magnetic cores, $n$ write windings and $n$ read windings associated with respective of said $n$ columns of cores, $m$ write windings associated with respective of said $m$ rows of cores, and $m$ output windings associated with respective rows of said cores, each of said cores being capable of being magnetized in a first state upon coincident energization of its two write windings;

(b) $n$ coincidence gates connected between individual stages of said register and respective of said $n$ write windings, each of said gates being connected to be enabled by an advance pulse from said digital computer and operable in combination to complement all $n$-bits of said digital words when the most significant of said $n$-bits is of a first quantity and to complement only the most significant of said $n$-bits when said most significant bit is of a second quantity;

(c) a selective switching means connected to be cycled in synchronism with said advance pulses from said computer and operable to energize said $m$ write windings successively;

(d) means responsive to periodic pulses from said computer for providing a plurality of $n$ successive read timing pulses having a time spacing which varies in accoradnce with the relative significance of successive bits of said digital words;

(e) circuit means for applying said $n$ read timing pulses to respective of said read windings of said memory matrix, thereby to induce output voltages in various of said $m$ output windings;

(f) $m$ pulse-averaging means; and (g) $m$ bistable switching means connected to be controlled by respective of said output voltages to apply different reference voltages of predetermined amplitudes to respective of said pulse-averaging means for time periods determined by the spacing of said read timing pulses, thereby to provide $m$ analog output voltages from said $m$ pulse-averaging means.

References Cited by the Examiner

UNITED STATES PATENTS 3,012,240  12/1961  Klahn _____ 340—347

MALCOLM A. MORRISON, *Primary Examiner.*

D. M. ROSEN, W. KOPACZ, *Assistant Examiners.*